US012653271B2

(12) United States Patent
Eldem et al.

(10) Patent No.: US 12,653,271 B2
(45) Date of Patent: *Jun. 16, 2026

(54) AIRBAG FOR ARTICLE OF FOOTWEAR

(71) Applicant: NIKE, Inc., Beaverton, OR (US)

(72) Inventors: Can Eldem, Portland, OR (US); Wade Flanagan, Portland, OR (US); Craig Fredrick, Portland, OR (US); Ryan Nyberg, Portland, OR (US); Jessica Small, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,414

(22) Filed: Nov. 11, 2024

(65) Prior Publication Data

US 2025/0064170 A1    Feb. 27, 2025

Related U.S. Application Data

(63) Continuation of application No. 18/163,550, filed on Feb. 2, 2023, now Pat. No. 12,161,187, which is a
(Continued)

(51) Int. Cl.
*A43B 13/20* (2006.01)
*A43B 13/18* (2006.01)
(Continued)

(52) U.S. Cl.
CPC .......... *A43B 13/206* (2013.01); *A43B 13/188* (2013.01); *A43B 13/203* (2013.01);
(Continued)

(58) Field of Classification Search
CPC ... A43B 13/206; A43B 13/188; A43B 13/203; A43B 21/26; B29D 35/142; B29K 2021/003
See application file for complete search history.

(56) References Cited

U.S. PATENT DOCUMENTS

| | | | |
|---|---|---|---|
| 2,863,230 | A | 12/1958 | Cortina |
| 2,981,010 | A | 4/1961 | Aaskov |

(Continued)

FOREIGN PATENT DOCUMENTS

| | | | |
|---|---|---|---|
| CN | 1285268 | A | 2/2001 |
| CN | 102481031 | A | 5/2012 |

(Continued)

OTHER PUBLICATIONS

United States Patent and Trademark Office, Office Action for U.S. Appl. No. 15/885,676, mailed Apr. 11, 2018.
(Continued)

*Primary Examiner* — Khoa D Huynh
*Assistant Examiner* — Erick I Lopez
(74) *Attorney, Agent, or Firm* — Honigman LLP; Matthew H. Szalach; Jonathan P. O'Brien

(57) ABSTRACT

A bladder for an article of footwear includes a chamber having (i) an arcuate segment extending from a first transition to a second transition, (ii) a first plurality of elongate segments extending in a first direction from the first transition to a first terminal end, and (iii) a second plurality of elongate segments spaced apart from the first plurality of elongate segments and extending in the first direction from the second transition to a second terminal end. The bladder also includes a web area connecting the arcuate segment, the first plurality of elongate segments, and the second plurality of elongate segments and extending to a terminal edge spaced apart from each of the first terminal end and the second terminal end.

19 Claims, 20 Drawing Sheets

Related U.S. Application Data continuation of application No. 17/320,974, filed on May 14, 2021, now Pat. No. 11,589,649, which is a continuation of application No. 16/037,935, filed on Jul. 17, 2018, now Pat. No. 11,026,476.

(51) Int. Cl.
*A43B 21/26* (2006.01)
*B29D 35/14* (2010.01)
*B29K 21/00* (2006.01)

(52) U.S. Cl.
CPC ............ *A43B 21/26* (2013.01); *B29D 35/142* (2013.01); *B29K 2021/003* (2013.01)

(56) References Cited

U.S. PATENT DOCUMENTS

| | | | |
|---|---|---|---|
| 4,222,185 A | 9/1980 | Giaccaglia | |
| 4,255,877 A | 3/1981 | Bowerman | |
| 4,798,010 A | 1/1989 | Sugiyama | |
| 4,817,304 A | 4/1989 | Parker et al. | |
| RE33,066 E | 9/1989 | Stubblefield | |
| 4,866,861 A | 9/1989 | Noone | |
| 4,947,560 A | 8/1990 | Fuerst et al. | |
| 5,113,599 A | 5/1992 | Cohen et al. | |
| 5,191,727 A | 3/1993 | Barry et al. | |
| 5,230,249 A | 7/1993 | Sasaki et al. | |
| 5,295,313 A | 3/1994 | Lee | |
| 5,313,717 A | 5/1994 | Allen et al. | |
| 5,331,750 A | 7/1994 | Sasaki et al. | |
| 5,363,570 A | 11/1994 | Allen et al. | |
| 5,575,088 A | 11/1996 | Allen et al. | |
| 5,595,004 A | 1/1997 | Lyden et al. | |
| 5,625,964 A | 5/1997 | Lyden et al. | |
| 5,713,141 A | 2/1998 | Mitchell et al. | |
| 5,862,614 A | 1/1999 | Koh | |
| 5,930,918 A | 8/1999 | Healy et al. | |
| 5,987,780 A | 11/1999 | Lyden et al. | |
| 6,013,340 A | 1/2000 | Bonk et al. | |
| 6,026,593 A | 2/2000 | Harmon-Weiss et al. | |
| 6,061,929 A | 5/2000 | Ritter | |
| 6,170,173 B1 | 1/2001 | Caston | |
| 6,233,846 B1 | 5/2001 | Sordi | |
| 6,237,251 B1 | 5/2001 | Litchfield et al. | |
| 6,253,466 B1 | 7/2001 | Harmon-Weiss et al. | |
| 6,266,897 B1 | 7/2001 | Seydel et al. | |
| 6,321,465 B1 | 11/2001 | Bonk et al. | |
| 6,354,020 B1 | 3/2002 | Kimball et al. | |
| 6,582,786 B1 | 6/2003 | Bonk et al. | |
| 6,618,959 B1 | 9/2003 | Sussmann | |
| 6,694,642 B2 | 2/2004 | Turner | |
| 6,754,981 B1 | 6/2004 | Edwards | |
| 6,817,112 B2 | 11/2004 | Berger et al. | |
| 6,843,000 B1 | 1/2005 | Park | |
| 7,013,583 B2 | 3/2006 | Greene et al. | |
| 7,096,605 B1 | 8/2006 | Kozo et al. | |
| 7,174,659 B2 | 2/2007 | Delgorgue | |
| 7,367,141 B2 | 5/2008 | Polegato Moretti | |
| 7,392,604 B2 | 7/2008 | Greene et al. | |
| 7,556,846 B2 | 7/2009 | Dojan et al. | |
| 7,565,754 B1 | 7/2009 | Acheson et al. | |
| 7,624,516 B2 | 12/2009 | Meschan | |
| 7,814,683 B2 | 10/2010 | Lee | |
| 7,877,897 B2 | 2/2011 | Teteriatnikov et al. | |
| 7,886,460 B2 | 2/2011 | Teteriatnikov et al. | |
| 7,950,167 B2 | 5/2011 | Nakano | |
| 8,001,703 B2 | 8/2011 | Schindler et al. | |
| 8,020,320 B2 | 9/2011 | Gillespie | |
| 8,225,533 B2 | 7/2012 | Meschan | |
| 8,302,329 B2 | 11/2012 | Hurd et al. | |
| 8,327,560 B2 | 12/2012 | Berend | |
| 8,572,867 B2 | 11/2013 | Parker | |
| 8,631,588 B2 | 1/2014 | Schindler et al. | |
| 8,640,363 B2 | 2/2014 | Hsu | |
| 8,650,775 B2 | 2/2014 | Peyton | |
| 8,732,981 B2 | 5/2014 | Cobb | |
| 8,863,408 B2 | 10/2014 | Schindler et al. | |
| 8,959,797 B2 | 2/2015 | Lyden | |
| 9,049,901 B2 | 6/2015 | Dean et al. | |
| 9,060,564 B2 | 6/2015 | Langvin et al. | |
| 9,144,268 B2 | 9/2015 | Swigart et al. | |
| 9,420,849 B2 | 8/2016 | Gishifu et al. | |
| 9,737,113 B2 | 8/2017 | Gishifu et al. | |
| 9,913,510 B2 | 3/2018 | Davis et al. | |
| 10,070,690 B2 | 9/2018 | Cortez et al. | |
| 10,123,587 B2 | 11/2018 | Gishifu et al. | |
| 10,149,513 B1 | 12/2018 | Eldem et al. | |
| 10,477,916 B2 | 11/2019 | Hartenstein et al. | |
| 10,524,540 B1 | 1/2020 | Eldem et al. | |
| 10,874,169 B2 | 12/2020 | Linkfield et al. | |
| 10,945,488 B2 | 3/2021 | Davis et al. | |
| 11,058,174 B2 | 7/2021 | Hale | |
| 11,197,513 B2 | 12/2021 | Rinaldi et al. | |
| 12,161,187 B2 * | 12/2024 | Eldem ..................... | A43B 21/26 |
| 2001/0052194 A1 | 12/2001 | Nishiwaki et al. | |
| 2003/0061732 A1 | 4/2003 | Turner | |
| 2003/0150133 A1 | 8/2003 | Staffaroni et al. | |
| 2004/0003517 A1 | 1/2004 | Marvin et al. | |
| 2004/0025375 A1 | 2/2004 | Turner et al. | |
| 2004/0181970 A1 | 9/2004 | Covatch | |
| 2005/0000116 A1 | 1/2005 | Snow | |
| 2005/0132609 A1 | 6/2005 | Dojan et al. | |
| 2005/0132610 A1 | 6/2005 | Foxen et al. | |
| 2005/0167029 A1 | 8/2005 | Rapaport et al. | |
| 2005/0183287 A1 | 8/2005 | Schindler | |
| 2006/0042122 A1 | 3/2006 | Yang | |
| 2006/0059714 A1 | 3/2006 | Harmon-Weiss et al. | |
| 2006/0086003 A1 | 4/2006 | Tseng | |
| 2006/0096125 A1 | 5/2006 | Yen | |
| 2006/0137221 A1 | 6/2006 | Dojan | |
| 2006/0201028 A1 | 9/2006 | Chan et al. | |
| 2006/0277794 A1 | 12/2006 | Schindler et al. | |
| 2007/0137068 A1 | 6/2007 | Fallon et al. | |
| 2007/0186446 A1 | 8/2007 | Lafortune | |
| 2007/0277401 A1 | 12/2007 | Young-Chul | |
| 2008/0005929 A1 | 1/2008 | Hardy et al. | |
| 2008/0083140 A1 | 4/2008 | Ellis | |
| 2008/0216355 A1 | 9/2008 | Becker | |
| 2009/0045547 A1 | 2/2009 | Schindler et al. | |
| 2009/0113757 A1 | 5/2009 | Banik | |
| 2009/0178300 A1 | 7/2009 | Parker | |
| 2009/0235557 A1 | 9/2009 | Christensen et al. | |
| 2010/0095556 A1 | 4/2010 | Jarvis | |
| 2010/0251565 A1 | 10/2010 | Litchfield et al. | |
| 2010/0281716 A1 | 11/2010 | Luthi et al. | |
| 2010/0325914 A1 | 12/2010 | Peyton | |
| 2011/0113650 A1 | 5/2011 | Hurd et al. | |
| 2011/0154689 A1 | 6/2011 | Chung | |
| 2011/0314695 A1 | 12/2011 | Tsai | |
| 2012/0060391 A1 | 3/2012 | Hong | |
| 2012/0210606 A1 | 8/2012 | Gheorghian et al. | |
| 2012/0227289 A1 | 9/2012 | Beers et al. | |
| 2012/0255197 A1 | 10/2012 | Gishifu et al. | |
| 2012/0255205 A1 | 10/2012 | Jensen et al. | |
| 2013/0086818 A1 | 4/2013 | Donnadieu | |
| 2014/0075777 A1 | 3/2014 | Bruce et al. | |
| 2014/0075778 A1 | 3/2014 | Bruce et al. | |
| 2014/0075779 A1 | 3/2014 | Bruce et al. | |
| 2014/0230276 A1 | 8/2014 | Campos, II et al. | |
| 2015/0040425 A1 | 2/2015 | Adams | |
| 2015/0047227 A1 | 2/2015 | Fallon et al. | |
| 2015/0210028 A1 | 7/2015 | Hansen | |
| 2015/0257481 A1 | 9/2015 | Campos, II et al. | |
| 2015/0272271 A1 | 10/2015 | Campos, II et al. | |
| 2016/0021972 A1 | 1/2016 | Grelle et al. | |
| 2016/0073732 A1 * | 3/2016 | Ernst ..................... | B29C 51/32 |
| | | | 36/28 |
| 2016/0075113 A1 | 3/2016 | Chang et al. | |
| 2016/0120262 A1 | 5/2016 | Cortez et al. | |
| 2016/0120263 A1 | 5/2016 | Cortez et al. | |
| 2016/0128424 A1 | 5/2016 | Connell et al. | |
| 2016/0192737 A1 | 7/2016 | Campos, II et al. | |
| 2016/0295967 A1 | 10/2016 | Campos, II et al. | |
| 2016/0324263 A1 | 11/2016 | Gishifu et al. | |

(56) References Cited

U.S. PATENT DOCUMENTS

| 2016/0345668 A1 | 12/2016 | Dyer et al. |
|---|---|---|
| 2017/0119096 A1 | 5/2017 | Greene |
| 2017/0172250 A1 | 6/2017 | Dolan et al. |
| 2017/0238652 A1 | 8/2017 | Langvin |
| 2017/0265564 A1 | 9/2017 | Peyton |
| 2017/0265565 A1 | 9/2017 | Connell et al. |
| 2017/0265566 A1 | 9/2017 | Case et al. |
| 2017/0340058 A1 | 11/2017 | Madore |
| 2018/0098601 A1 | 4/2018 | Hartenstein et al. |
| 2019/0200700 A1 | 7/2019 | Hale |
| 2019/0231027 A1 | 8/2019 | Eldem et al. |
| 2019/0239596 A1 | 8/2019 | Ploem |
| 2019/0261737 A1 | 8/2019 | Walsh et al. |
| 2020/0022454 A1 | 1/2020 | Eldem et al. |
| 2020/0046068 A1 | 2/2020 | Choi |
| 2020/0121022 A1 | 4/2020 | Edwards et al. |
| 2020/0170335 A1 | 6/2020 | Horvath et al. |
| 2020/0205514 A1 | 7/2020 | VanDomelen |
| 2020/0275739 A1 | 9/2020 | Linkfield et al. |
| 2020/0305544 A1 | 10/2020 | Cross |
| 2020/0305549 A1 | 10/2020 | Bailly et al. |
| 2021/0145118 A1 | 5/2021 | Campos, II et al. |
| 2021/0145119 A1 | 5/2021 | Campos, II et al. |
| 2021/0315319 A1 | 10/2021 | Klein et al. |
| 2021/0368922 A1 | 12/2021 | Ho et al. |
| 2021/0368924 A1 | 12/2021 | James et al. |
| 2022/0160076 A1 | 5/2022 | Edwards et al. |

FOREIGN PATENT DOCUMENTS

| CN | 103561603 A | 2/2014 |
|---|---|---|
| CN | 105008119 A | 10/2015 |
| CN | 105361346 A | 3/2016 |
| CN | 105394881 A | 3/2016 |
| CN | 107072349 A | 8/2017 |
| CN | 107404973 A | 11/2017 |
| DE | 3245182 A1 | 5/1983 |
| EP | 2445369 A2 | 5/2012 |
| KR | 100553027 B1 | 2/2006 |
| WO | WO-2017079255 | 5/2017 |
| WO | WO-2017160946 A1 | 9/2017 |

OTHER PUBLICATIONS

United States Patent and Trademark Office, Office Action for U.S. Appl. No. 15/885,695, mailed Apr. 6, 2018.

United States Patent and Trademark Office, Final Office Action for U.S. Appl. No. 15/885,695, mailed Oct. 24, 2018.

United States Patent and Trademark Office, Non-Final Office Action for U.S. Appl. No. 16/037,979, mailed Nov. 29, 2019.

European Patent Office (ISA), International Search Report and Written Opinion for International Application No. PCT/US2019/015641, mailed Apr. 15, 2019.

European Patent Office (ISA). International Search Report and Written Opinion for International Application No. PCT/US2019/015655, mailed Apr. 24, 2019.

European Patent Office (ISA), International Search Report and Written Opinion for International Application No. PCT/US2019/041904, mailed Nov. 4, 2019.

European Patent Office (ISA), International Search Report and Written Opinion for International Application No. PCT/US2019/041902, mailed Nov. 5, 2019.

United States Patent and Trademark Office, Final Office Action for U.S. Appl. No. 15/885,695, mailed Apr. 21, 2020.

United States Patent and Trademark Office, Final Office Action for U.S. Appl. No. 16/037,935, mailed Apr. 16, 2020.

China Office Action date Apr. 25, 2021 for Application 201980011214.X.

United States Patent and Trademark Office, Non-Final Office Action for U.S. Appl. No. 16/037,935, mailed Sep. 4, 2020.

United States Patent and Trademark Office, Non-Final Office Action for U.S. Appl. No. 16/200,550, mailed Oct. 9, 2020.

China Patent Office, Office Action for Application No. 201980047915.9 dated Jul. 30, 2021.

European Patent Office, Communication Pursuant to Article 94(3) EPC dated Jul. 20, 2021 for application No. 19705037.0.

United States Patent and Trademark Office, Office Action for U.S. Appl. No. 17/525,565, mailed Apr. 8, 2022.

United States Patent and Trademark Office, Office Action for U.S. Appl. No. 17/525,621, mailed Apr. 8, 2022.

United States Patent and Trademark Office, Office Action for U.S. Appl. No. 17/525,638, mailed Apr. 18, 2022.

United States Patent and Trademark Office, Office Action for U.S. Appl. No. 17/526,703, mailed Apr. 18, 2022.

United States Patent and Trademark Office, Office Action for U.S. Appl. No. 17/526,447, mailed Apr. 8, 2022.

Korean Intellectual Property Office, Office Action for application No. 10-2020-7025153 dated Oct. 21, 2021.

China Intellectual Property Office, Office Action for application No. 201980011214.X dated Jan. 5, 2022.

Korean Intellectual Property Office, First Office Action for application No. 10-2021-7004624 mailed Jul. 17, 2022.

United States Patent and Trademark Office, Final Office Action for U.S. Appl. No. 17/526,447 mailed Jul. 25, 2022.

United States Patent and Trademark Office, Final Office Action for U.S. Appl. No. 17/525,621 mailed Jul. 26, 2022.

United States Patent and Trademark Office, Non-Final Office Action for U.S. Appl. No. 17/525,565 mailed Aug. 1, 2022.

United States Patent and Trademark Office, Final Office Action for U.S. Appl. No. 17/525,638 mailed Aug. 2, 2022.

United States Patent and Trademark Office, Office Action for U.S. Appl. No. 18/315,577, mailed Feb. 13, 2024.

* cited by examiner

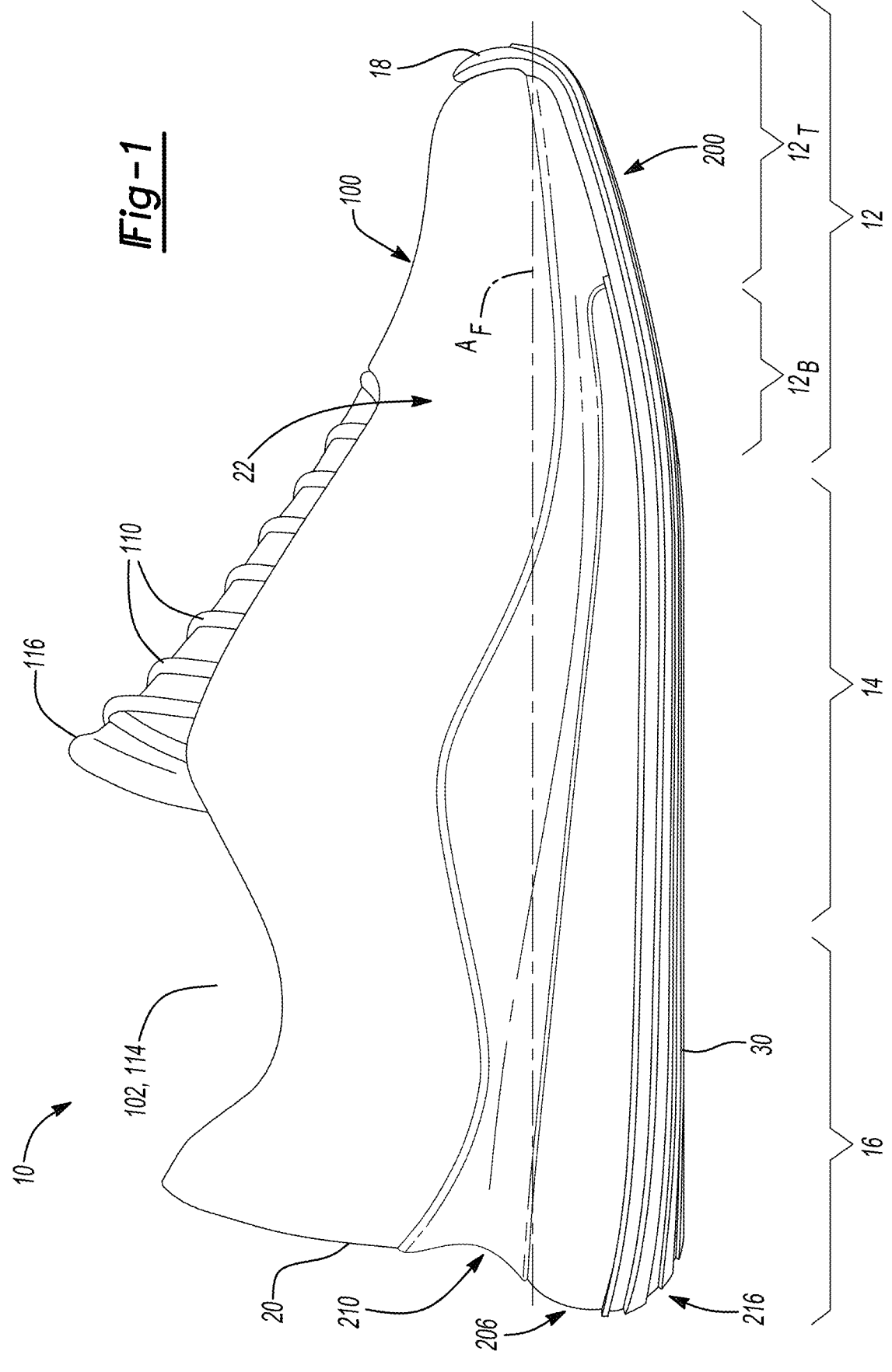
_Fig–1_

AIRBAG FOR ARTICLE OF FOOTWEAR

CROSS-REFERENCE TO RELATED APPLICATIONS

This application is a continuation of U.S. patent application Ser. No. 18/163,550, filed Feb. 2, 2023, which is a continuation of U.S. patent application Ser. No. 17/320,974, filed May 14, 2021, which is a continuation of U.S. patent application Ser. No. 16/037,935, filed Jul. 17, 2018, the disclosures of which are hereby incorporated by reference in their entireties.

FIELD

The present disclosure relates generally to sole structures for articles of footwear, and more particularly, to sole structures incorporating a fluid-filled bladder.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. The midsole may additionally or alternatively incorporate a fluid-filled bladder to increase durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

Midsoles employing fluid-filled bladders typically include a bladder formed from two barrier layers of polymer material that are sealed or bonded together. The fluid-filled bladders are pressurized with a fluid such as air, and may incorporate tensile members within the bladder to retain the shape of the bladder when compressed resiliently under applied loads, such as during athletic movements. Generally, bladders are designed with an emphasis on balancing support for the foot and cushioning characteristics that relate to responsiveness as the bladder resiliently compresses under an applied load

BRIEF DESCRIPTION OF DRAWINGS

The drawings described herein are for illustrative purposes only of selected configurations and are not intended to limit the scope of the present disclosure.

FIG. 1 is a side elevation view of an article of footwear in accordance with principles of the present disclosure;

Corresponding reference numerals indicate corresponding parts throughout the drawings.

DETAILED DESCRIPTION

Figure 2:
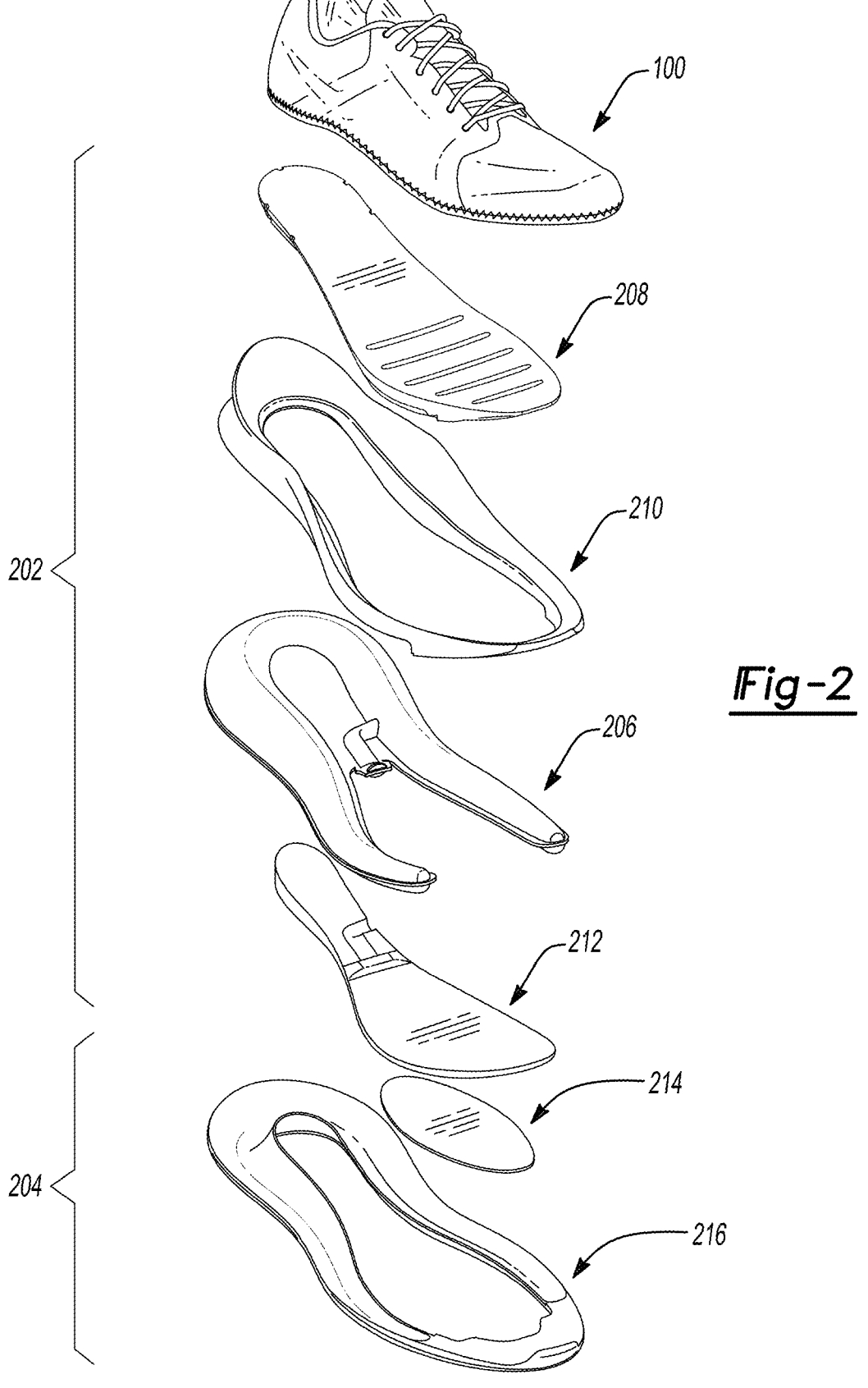
FIG. 2 is an exploded view of the article of footwear of FIG. 1, showing an article of footwear having an upper and a sole structure arranged in a layered configuration.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A bladder for an article of footwear is provided and includes a chamber having (i) an arcuate segment extending from a first transition to a second transition, (ii) a first plurality of elongate segments extending in a first direction from the first transition to a first terminal end, and (iii) a second plurality of elongate segments spaced apart from the first plurality of elongate segments and extending in the first direction from the second transition to a second terminal end. The bladder also includes a web area connecting the arcuate segment, the first plurality of elongate segments, and the second plurality of elongate segments and extending to a terminal edge spaced apart from each of the first terminal end and the second terminal end.

The first plurality of elongate segments may include (i) a first heel segment extending from the first transition to a third transition, (ii) a first mid-foot segment extending from the third transition to a fifth transition, and (iii) a first forefoot segment extending from the fifth transition to the first terminal end, the arcuate segment, the first heel segment, and the first mid-foot segment being aligned along a plane and the first forefoot segment extending away from the plane. Additionally or alternatively, the second plurality of elongate segments may include (i) a second heel segment extending from the first transition to a third transition, (ii) a second mid-foot segment extending from the third transition to a fifth transition, and (iii) a second forefoot segment extending from the fifth transition to the first terminal end, the arcuate segment, the second heel segment, and the second mid-foot segment being aligned along the plane and the second forefoot segment extending away from the plane.

In one configuration, the first heel segment and the second heel segment may converge with each other along the first direction and the first mid-foot segment and the second mid-foot segment diverge from each other along the first direction.

The web area may extend between the first heel segment and the second heel segment. Further, the first forefoot segment and the second forefoot segment may not be directly connected by the web area.

A thickness of the chamber may taper continuously from the arcuate segment to each of the first terminal end and the second terminal end.

In one configuration, the web area may include an inflation conduit extending in a first direction from a terminal edge to one of the segments of the chamber. The web area may include a tab extending in a second direction from the terminal edge, the tab including an inlet of the inflation conduit. The inlet of the inflation conduit may include a crimped region formed on the tab.

In another configuration, a bladder for an article of footwear is provided and includes a chamber having a plurality of sequentially arranged segments fluidly coupled to each other at respective transitions. The plurality of sequentially arranged segments include (i) an arcuate segment extending along an arcuate path from a first transition on a medial side of the bladder to a second transition on a lateral side of the bladder, (ii) a first elongate segment extending in a first direction from the first transition to a third transition, (iii) a second elongate segment extending in the first direction from the second transition to a fourth transition and converging with the first elongate segment along the first direction, (iv) a third elongate segment extending in the first direction from the third transition to a first terminal end, and (v) a fourth elongate segment extending in the first direction from the fourth transition to a second terminal end, the arcuate segment and at least one of the first elongate segment and the second elongate segment cooperating to define a bottom surface plane of the chamber and the third elongate segment and the fourth elongate segment extending away from the bottom surface plane. The bladder further includes a web area extending between the first elongate segment and the second elongate segment.

In one configuration, the web area may extend continuously from the arcuate segment to a terminal edge formed between the first elongate segment and the second elongate segment.

The chamber and the web area may be formed of a first barrier layer and a second barrier layer, the first barrier layer being joined to the second barrier layer in the web area and spaced apart from the second barrier layer at the chamber. The first barrier layer may include a first multilayer film and the second barrier layer may include a second multilayer film. The first multilayer film and the second multilayer film may each independently include one or more thermoplastic polyurethane copolymers. The first multilayer film and the second multilayer film may each further independently include one or more ethylene-vinyl alcohol copolymers.

The arcuate segment, first elongate segment, the second elongate segment, the third elongate segment, and the fourth elongate segment may cooperate to define a continuous interior void. Additionally or alternatively, the third elongate segment and the fourth elongate segment may curve away from the bottom surface plane.

In one configuration, a thickness of the chamber may taper continuously at a constant first rate from the arcuate segment to the third transition, and may taper at a variable second rate from the third transition to the first terminal end. The chamber may have a circular cross-section.

Figure 3:
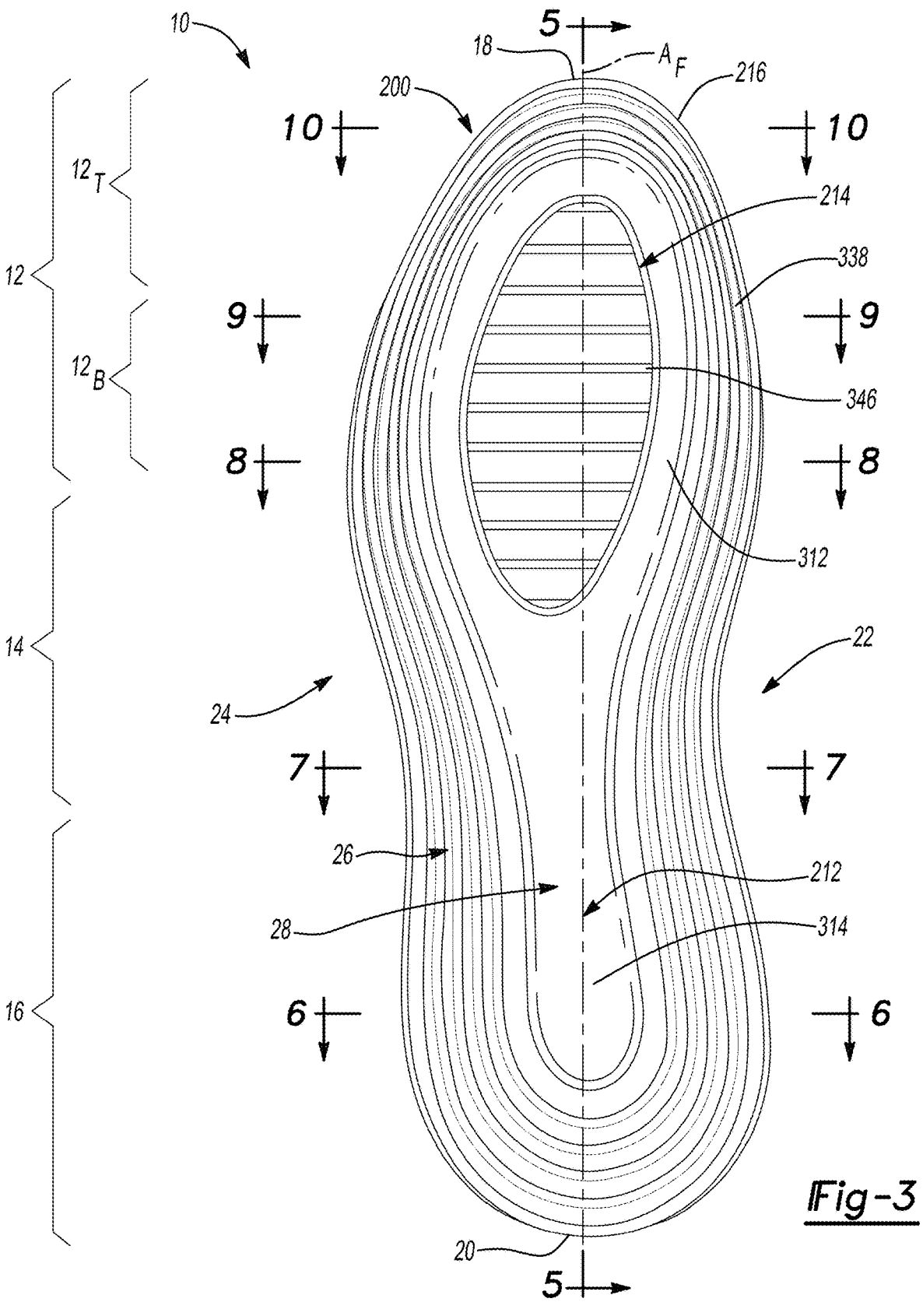
FIG. 3 is bottom perspective view of the article of footwear of FIG. 1.

Referring to FIGS. 1-3, an article of footwear 10 includes an upper 100 and sole structure 200. The article of footwear 10 may be divided into one or more regions. The regions may include a forefoot region 12, a mid-foot region 14, and a heel region 16. The forefoot region 12 may be subdivided into a toe portion 12r corresponding with phalanges and a ball portion 12B associated with metatarsal bones of a foot. The mid-foot region 14 may correspond with an arch area of the foot, and the heel region 16 may correspond with rear portions of the foot, including a calcaneus bone.

The footwear 10 may further include an anterior end 18 associated with a forward-most point of the forefoot region 12, and a posterior end 20 corresponding to a rearward-most point of the heel region 16. As shown in FIGS. 1 and 3, a longitudinal axis $A_F$ of the footwear 10 extends along a length of the footwear 10 from the anterior end 18 to the posterior end 20 parallel to a ground surface, and generally divides the footwear 10 into a medial side 22 and a lateral side 24. Accordingly, the medial side 22 and the lateral side 24 respectively correspond with opposite sides of the footwear 10 and extend through the regions 12, 14, 16. As used herein, a longitudinal direction refers to the direction extending from the anterior end 18 to the posterior end 20, while a lateral direction refers to the direction transverse to the longitudinal direction and extending from the medial side 22 to the lateral side 24.

The article of footwear 10, and more particularly, the sole structure 200, may be further described as including a peripheral region 26 and an interior region 28, as indicated in FIG. 3. The peripheral region 26 is generally described as being a region between the interior region 28 and an outer perimeter of the sole structure 200. Particularly, the peripheral region 26 extends from the forefoot region 12 to the heel region 16 along each of the medial side 22 and the lateral side 24, and wraps around each of the forefoot region 12 and the heel region 16. Thus, the interior region 28 is circumscribed by the peripheral region 26, and extends from the forefoot region 12 to the heel region 16 along a central portion of the sole structure 200.

The upper 100 includes interior surfaces that define an interior void 102 configured to receive and secure a foot for support on sole structure 200. The upper 100 may be formed from one or more materials that are stitched or adhesively bonded together to form the interior void 102. Suitable materials of the upper may include, but are not limited to, mesh, textiles, foam, leather, and synthetic leather. The materials may be selected and located to impart properties of durability, air-permeability, wear-resistance, flexibility, and comfort.

With reference to FIGS. 5-10, in some examples the upper 100 includes a strobel 104 having a bottom surface opposing the sole structure 200 and an opposing top surface defining a footbed 106 of the interior void 102. Stitching or adhesives may secure the strobel to the upper 100. The footbed 106 may be contoured to conform to a profile of the bottom surface (e.g., plantar) of the foot. Optionally, the upper 100 may also incorporate additional layers such as an insole 108 or sockliner that may be disposed upon the strobel 104 and reside within the interior void 102 of the upper 100 to receive a plantar surface of the foot to enhance the comfort of the article of footwear 10. An ankle opening 114 in the heel region 16 may provide access to the interior void 102. For example, the ankle opening 114 may receive a foot to secure the foot within the void 102 and to facilitate entry and removal of the foot from and to the interior void 102.

In some examples, one or more fasteners 110 extend along the upper 100 to adjust a fit of the interior void 102 around the foot and to accommodate entry and removal of the foot therefrom. The upper 100 may include apertures, such as eyelets and/or other engagement features such as fabric or mesh loops that receive the fasteners 110. The fasteners 110 may include laces, straps, cords, hook-and-loop, or any other suitable type of fastener. The upper 100 may include a tongue portion 116 that extends between the interior void 102 and the fasteners.

With reference to FIG. 2, the sole structure 200 includes a midsole 202 configured to provide cushioning characteristics to the sole structure 200, and an outsole 204 configured to provide a ground-engaging surface 30 of the article of footwear 10. Unlike conventional sole structures, each of the midsole 202 and the outsole 204 are formed compositely, whereby each is formed of multiple subcomponents. For example, the midsole 202 includes a bladder 206, an inner cushion 208, an outer cushion 210, and a lower cushion 212. Likewise, the outsole 204 includes an interior outsole 214 and a peripheral outsole 216 formed separately from the interior outsole 214. The subcomponents 206, 208, 210, 212, 214, 216 are assembled and secured to each other using various methods of bonding, including adhesively bonding and melding, for example.

With reference to FIGS. 5-11D, the bladder 206 of the midsole 202 includes an opposing pair of barrier layers 218a, 218b, which can be joined to each other at discrete locations to define an elongate fluid-filled chamber 220, a web area 222, and a peripheral seam 224. In the shown embodiment, the barrier layers 218a, 218b include a first, upper barrier layer 218a and a second, lower barrier layer 218b. Alternatively, fluid-filled chamber 220 can be produced from any suitable combination of one or more barrier layers.

As used herein, the term "barrier layer" (e.g., barrier layers 218a, 218b) encompasses both monolayer and multilayer films. In some embodiments, one or both of barrier layers 218a, 218b are each produced (e.g., thermoformed or blow molded) from a monolayer film (a single layer). In other embodiments, one or both of barrier layers 218a, 218b are each produced (e.g., thermoformed or blow molded) from a multilayer film (multiple sublayers). In either aspect, each layer or sublayer can have a film thickness ranging from about 0.2 micrometers to about be about 1 millimeter. In further embodiments, the film thickness for each layer or sublayer can range from about 0.5 micrometers to about 500 micrometers. In yet further embodiments, the film thickness for each layer or sublayer can range from about 1 micrometer to about 100 micrometers.

One or both of barrier layers 218a, 218b can independently be transparent, translucent, and/or opaque. As used herein, the term "transparent" for a barrier layer and/or a fluid-filled chamber means that light passes through the barrier layer in substantially straight lines and a viewer can see through the barrier layer. In comparison, for an opaque barrier layer, light does not pass through the barrier layer and one cannot see clearly through the barrier layer at all. A translucent barrier layer falls between a transparent barrier layer and an opaque barrier layer, in that light passes through a translucent layer but some of the light is scattered so that a viewer cannot see clearly through the layer.

Barrier layers 218a, 218b can each be produced from an elastomeric material that includes one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier layers 218a, 218b may include two or more sublayers (multilayer film) such as shown in Mitchell et al., U.S. Pat. No. 5,713,141 and Mitchell et al., U.S. Pat. No. 5,952,065, the disclosures of which are incorporated by reference in their entirety. In embodiments where the barrier layers 218a, 218b include two or more sublayers, examples of suitable multilayer films include microlayer films, such as those disclosed in Bonk et al., U.S. Pat. No. 6,582,786, which is incorporated by reference in its entirety. In further embodiments, barrier layers 218a, 218b may each independently include alternating sublayers of one or more TPU copolymer materials and one or more EVOH copolymer materials, where the total number of sublayers in each of barrier layers 218a, 218b includes at least four (4) sublayers, at least ten (10) sublayers, at least twenty (20) sublayers, at least forty (40) sublayers, and/or at least sixty (60) sublayers.

Fluid-filled chamber 220 can be produced from barrier layers 218a, 218b using any suitable technique, such as thermoforming (e.g. vacuum thermoforming), blow molding, extrusion, injection molding, vacuum molding, rotary molding, transfer molding, pressure forming, heat scaling, casting, low-pressure casting, spin casting, reaction injection molding, radio frequency (RF) welding, and the like. In an aspect, barrier layers 218a, 218b can be produced by co-extrusion followed by vacuum thermoforming to produce an inflatable chamber 220, which can optionally include one or more valves (e.g., one way valves) that allows chamber 220 to be filled with the fluid (e.g., gas).

Chamber 220 can be provided in a fluid-filled (e.g., as provided in footwear 10) or in an unfilled state. Chamber 220 can be filled to include any suitable fluid, such as a gas or liquid. In an aspect, the gas can include air, nitrogen ($N_2$), or any other suitable gas. In other aspects, chamber 220 can alternatively include other media, such as pellets, beads, ground recycled material, and the like (e.g., foamed beads and/or rubber beads). The fluid provided to the chamber 220 can result in the chamber 220 being pressurized. Alternatively, the fluid provided to the chamber 220 can be at atmospheric pressure such that the chamber 220 is not pressurized but, rather, simply contains a volume of fluid at atmospheric pressure.

Fluid-filled chamber 220 desirably has a low gas transmission rate to preserve its retained gas pressure. In some embodiments, fluid-filled chamber 220 has a gas transmission rate for nitrogen gas that is at least about ten (10) times lower than a nitrogen gas transmission rate for a butyl rubber layer of substantially the same dimensions. In an aspect, fluid-filled chamber 220 has a nitrogen gas transmission rate of 15 cubic-centimeter/square-meter·atmosphere·day ($cm^3$/$m^2$·atm·day) or less for an average film thickness of 500 micrometers (based on thicknesses of barrier layers 218a, 218b). In further aspects, the transmission rate is 10 $cm^3$/$m^2$·atm·day or less, 5 $cm^3$/$m^2$·atm·day or less, or 1 $cm^3$/$m^2$·atm·day or less.

Referring to FIGS. 11A-11D, the fluid-filled chamber 220 includes a series of interconnected, fluid-filled segments 226, 228, 230 disposed along the peripheral region 26 of the sole structure 200. When assembled to in the sole structure 200, the fluid-filled chamber 220 is configured to be at least partially exposed along the peripheral region 26 and extends continuously from the toe portion $12_T$ on the medial side 22, around the posterior end 20, and to the toe portion $12_T$ on the lateral side 24.

In some implementations, the upper barrier layer 218a and the lower barrier layer 218b cooperate to define a geometry (e.g., thicknesses, width, and lengths) of the fluid-filled chamber 220. For example, the web area 222 and the peripheral seam 224 may cooperate to bound and extend around the fluid-filled chamber 220 to seal the fluid (e.g., air) within the fluid-filled chamber 220. Thus, the fluid-filled chamber 220 is associated with an area of the bladder 206 where interior surfaces of the upper and lower barrier layers 218a, 218b are not joined together and, thus, are separated from one another.

As shown in FIGS. 5-9, a space formed between opposing interior surfaces of the upper and lower barrier layers 218a, 218b defines an interior void 231 of the fluid-filled chamber 220. In the illustrated example, the interior void 231 has a circular cross-sectional shape and defines an inside diameter Dc of the fluid-filled chamber 220. As discussed in greater detail below, the inside diameter Dc of the fluid-filled chamber 220 tapers continuously from a first inside diameter $D_{C1}$ the heel region 16 to a second inside diameter Des in the forefoot region 12, as shown in FIGS. 5-9.

Similarly, exterior surfaces of the upper and lower barrier layers 218a, 218b define an exterior profile of the fluid-filled chamber 220, which has a circular cross-sectional shape corresponding to the inside diameter De of the interior void 231. Accordingly, the upper and lower barrier layers 218a, 218b define respective upper and lower surfaces 232a, 232b of the fluid-filled chamber 220, which converge with each other in a direction from the posterior end 20 to the forefoot region 12 to define a tapering thickness Tc of the fluid-filled chamber 220.

Figure 11A:
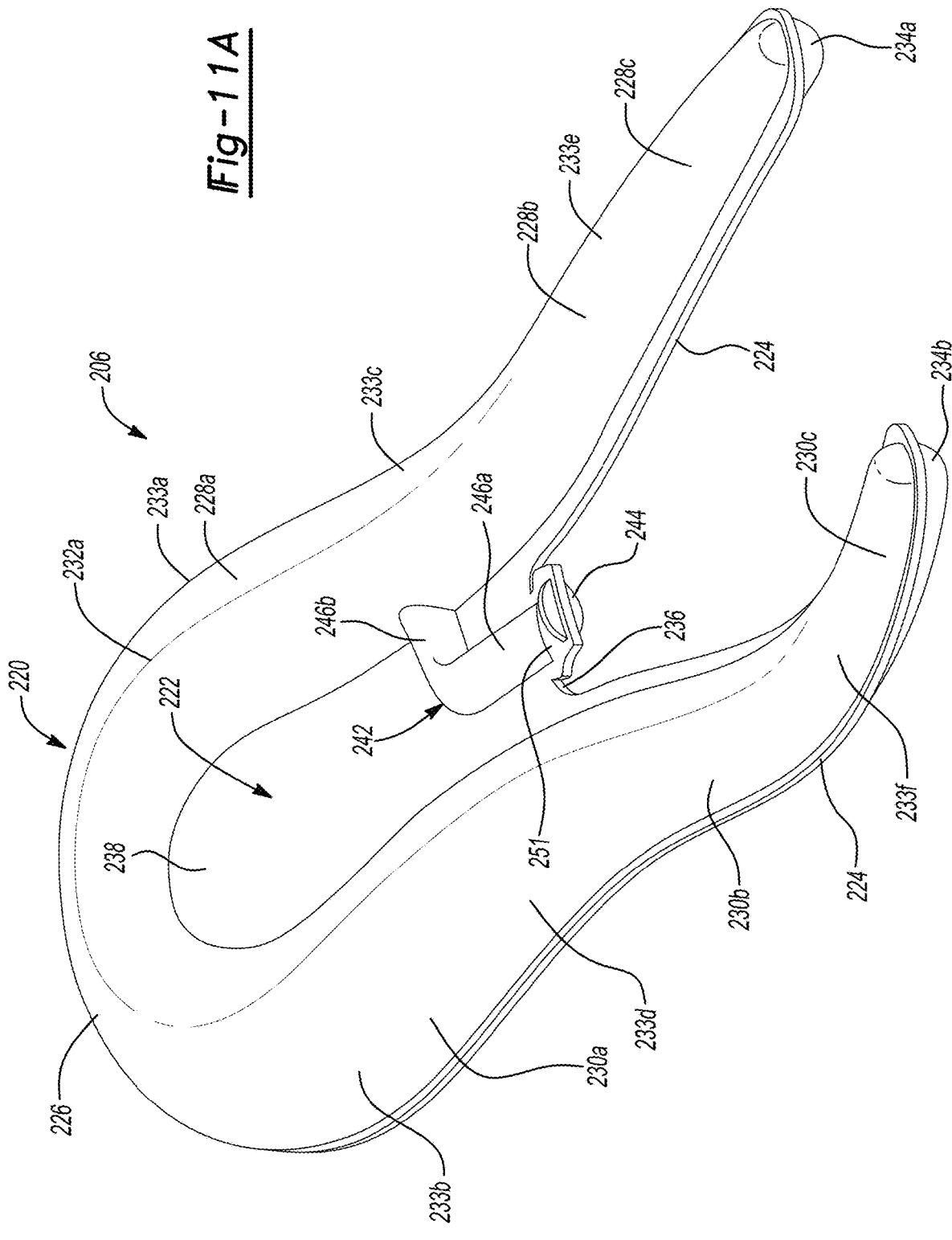
FIGS. 11A and 11B are top and bottom perspective views of a bladder of the article of footwear of FIG. 1.
Figure 11B:
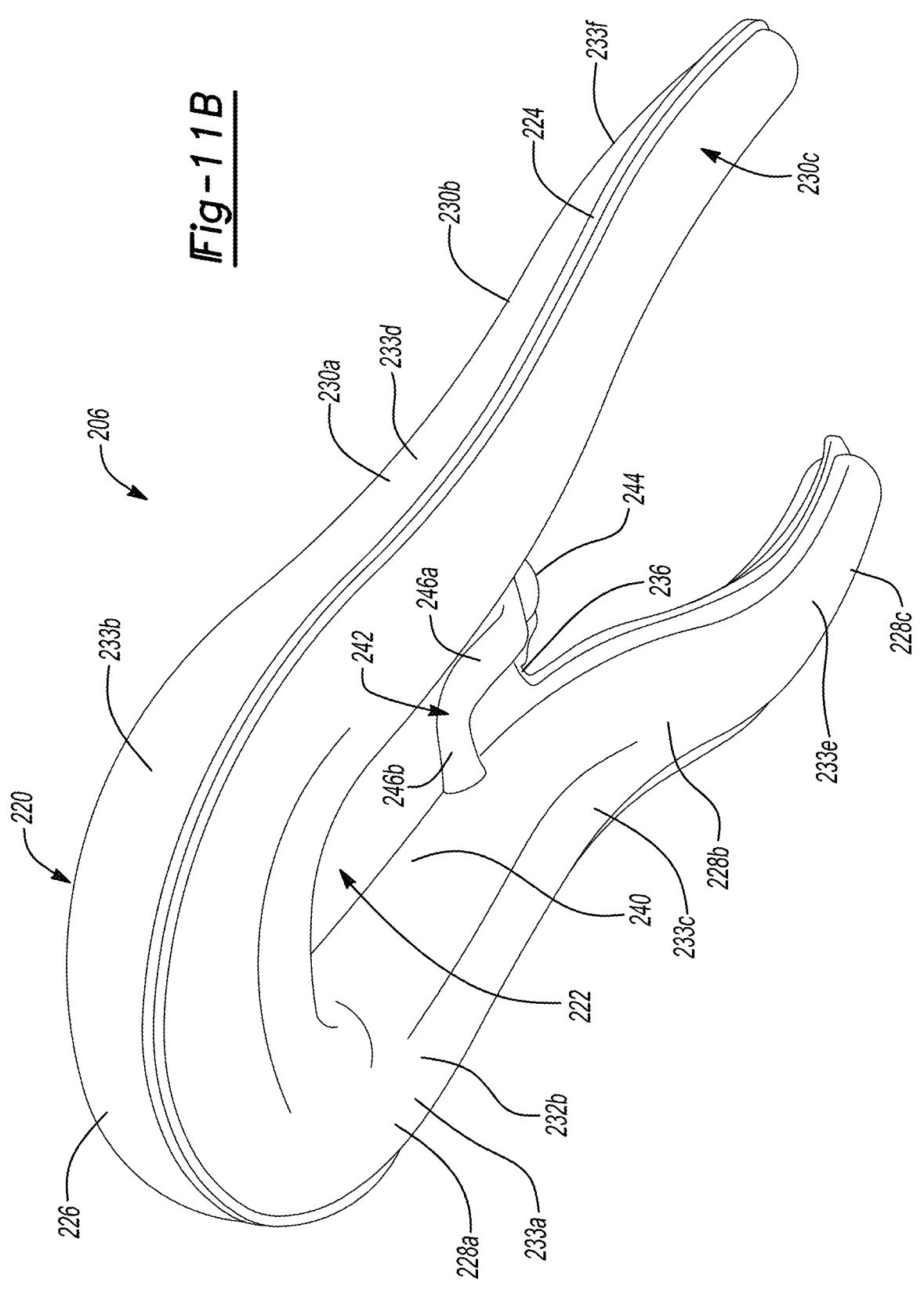
Figure 11C:
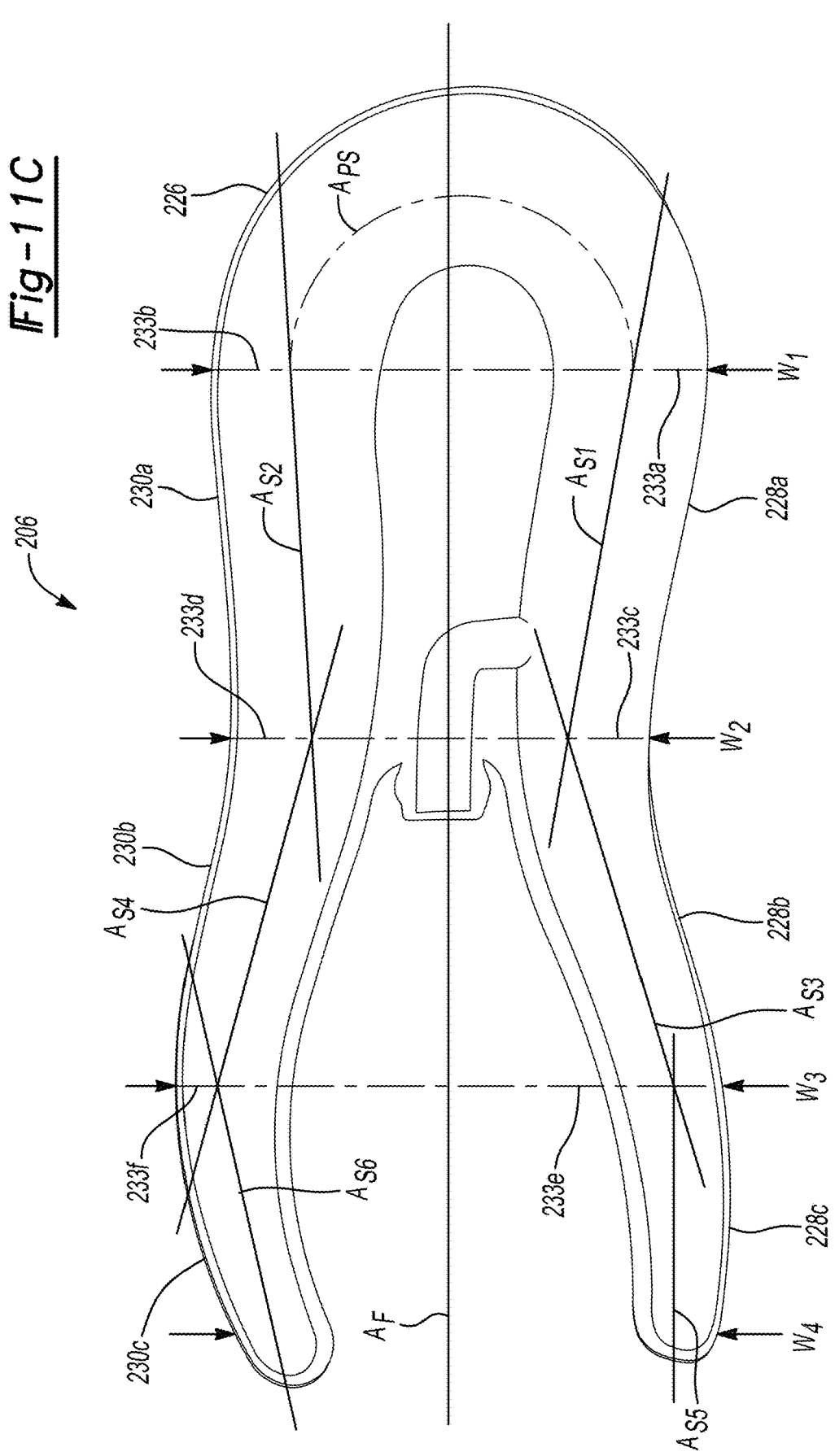
FIG. 11C is a top plan view of the bladder of FIGS. 11A and 11B.

With reference to FIG. 11C, the fluid-filled chamber 220 may be described as including an arcuate posterior segment 226, a plurality of elongate medial segments 228, and a plurality of elongate lateral segments 230, all disposed within the peripheral region 26 of the sole structure 200 and fluidly coupled to each other at respective transitions 233. The posterior segment 226 extends around the posterior end 20 of the sole structure 200, from a first transition 233a on the medial side 22 to a second transition 233b on the lateral side 24. The medial segments 228 extend from the first transition 233a and along the medial side 22 of the peripheral region 26 to a first terminal end 234a of the fluid-filled chamber 220, located between the ball portion 12B and the toe portion 12r of the forefoot region 12. Likewise, the lateral segments 230 extend from the second transition 233b and along the lateral side 24 to a second terminal end 234b of the fluid-filled chamber, located in the forefoot region 12. The terminal ends 234a, 234b of the fluid-filled chamber 220 are substantially hemispherical in shape, whereby the upper and lower barrier layers 218a, 218b have a constant radius of curvature. As shown, an outer peripheral portion of the upper surface 232a of the fluid-filled chamber 220 is exposed around the outer periphery of the sole structure 200.

With continued reference to FIG. 11C, the posterior segment 226 extends around the posterior end 20 of the heel region 16 and fluidly couples to the medial segments 228 and the lateral segments 230. More specifically, the posterior segment 226 extends along a substantially arcuate path or axis APS to connect a posterior end of the medial segments 228 to a posterior end of the lateral segments 230. Furthermore, the posterior segment 226 is continuously formed with the medial segments 228 and the lateral segments 230. Accordingly, the fluid-filled chamber 220 may generally define a hairpin shape, whereby the posterior segment 226 couples to the medial segments 228 and the lateral segments 230 at respective ones of the medial side 22 and the lateral side 24. As shown in FIG. 1, the posterior segment 226 protrudes beyond the posterior end 20 of the upper 100, such that the upper 100 is offset towards the anterior end 18 from the rear-most portion of the posterior segment 226.

Referring still to FIG. 11C, the medial segments 228 and the lateral segments 230 are continuously formed along each of the medial side 22 and the lateral side 24, and extend along a generally serpentine path from the posterior segment 226 to the respective terminal ends 234. The medial segments 228 and the lateral segments 230 may be described as extending along respective longitudinal segment axes $A_S$, whereby the ends of sequentially-adjacent ones of the segments 228, 230 intersect each other at arcuate transitions 233, as described in greater detail below. The orientations of the segment axes $A_{S1-S6}$ are described with respect to the longitudinal axis $A_F$ of the article of footwear 10, as defined above. Referring again to FIG. 11C, the medial segments 228 include a medial heel segment 228a, a medial mid-foot segment 228b, and a medial forefoot segment 228c, which are arranged in series along the medial side 22 of the peripheral region 26. Similarly, the lateral segments 230 include a lateral heel segment 230a, a lateral mid-foot segment 230b, and a lateral forefoot segment 230c arranged in series along the lateral side 24 of the peripheral region.

The medial heel segment 228a extends along a first longitudinal segment axis $A_{S1}$ from the first transition 233a at the posterior segment 226 to a third transition 233c in the mid-foot region 14. As shown in FIG. 11C, first longitudinal segment axis $A_{S1}$ converges with the longitudinal axis $A_F$ of the article of footwear 10 in a direction from the first transition 233a to the third transition 233b. Similarly, the lateral heel segment 230a extends along a second longitudinal segment axis $A_{S2}$ from the second transition 233b at the posterior segment 226 to a fourth transition 233d in the mid-foot region 14. The second longitudinal segment axis $A_{S2}$ also converges with the longitudinal axis $A_F$ of the article of footwear 10 in a direction from the second transition 233b to the fourth transition 233d. Accordingly, the medial heel segment 228a and the lateral heel segment 228b converge with each other along the direction from the posterior segment 226 to the mid-foot region 14, whereby an overall width W of the fluid-filled chamber 220 tapers from a first width $W_1$ at the heel region 16 to a lesser, second width $W_2$ across the third and fourth transitions 233c, 233d, as shown in FIG. 11C.

Referring still to FIG. 11C, the medial midfoot segment 228b extends along a third longitudinal segment axis $A_{S3}$ from the third transition 233c in the mid-foot region 14 to a fifth transition 233e in the forefoot region 12. As shown in FIG. 11C, the third longitudinal segment axis $A_{S3}$ diverges from the longitudinal axis $A_F$ of the article of footwear 10 along the direction from the third transition 233c to the fifth transition 233c. Similarly, the lateral mid-foot segment 230b extends along a fourth longitudinal segment axis $A_{S4}$ from the fourth transition 233d in the mid-foot region 14 to a sixth transition 233f in the forefoot region 12. The fourth longitudinal segment axis $A_{S4}$ diverges from the longitudinal axis $A_F$ of the article of footwear 10 in a direction from the fourth transition 233d to the sixth transition 233f. Accordingly, the medial mid-foot segment 228b and the lateral mid-foot segment 230b diverge from each other along the direction from the mid-foot region 14 to the forefoot region 12, whereby the overall width W of the fluid-filled chamber 220 flares from the second width $W_2$ across the third and fourth transitions 233c, 233d to a third width $W_3$ across the fifth and sixth transitions 233c, 233f.

Figures 11D, 11E:
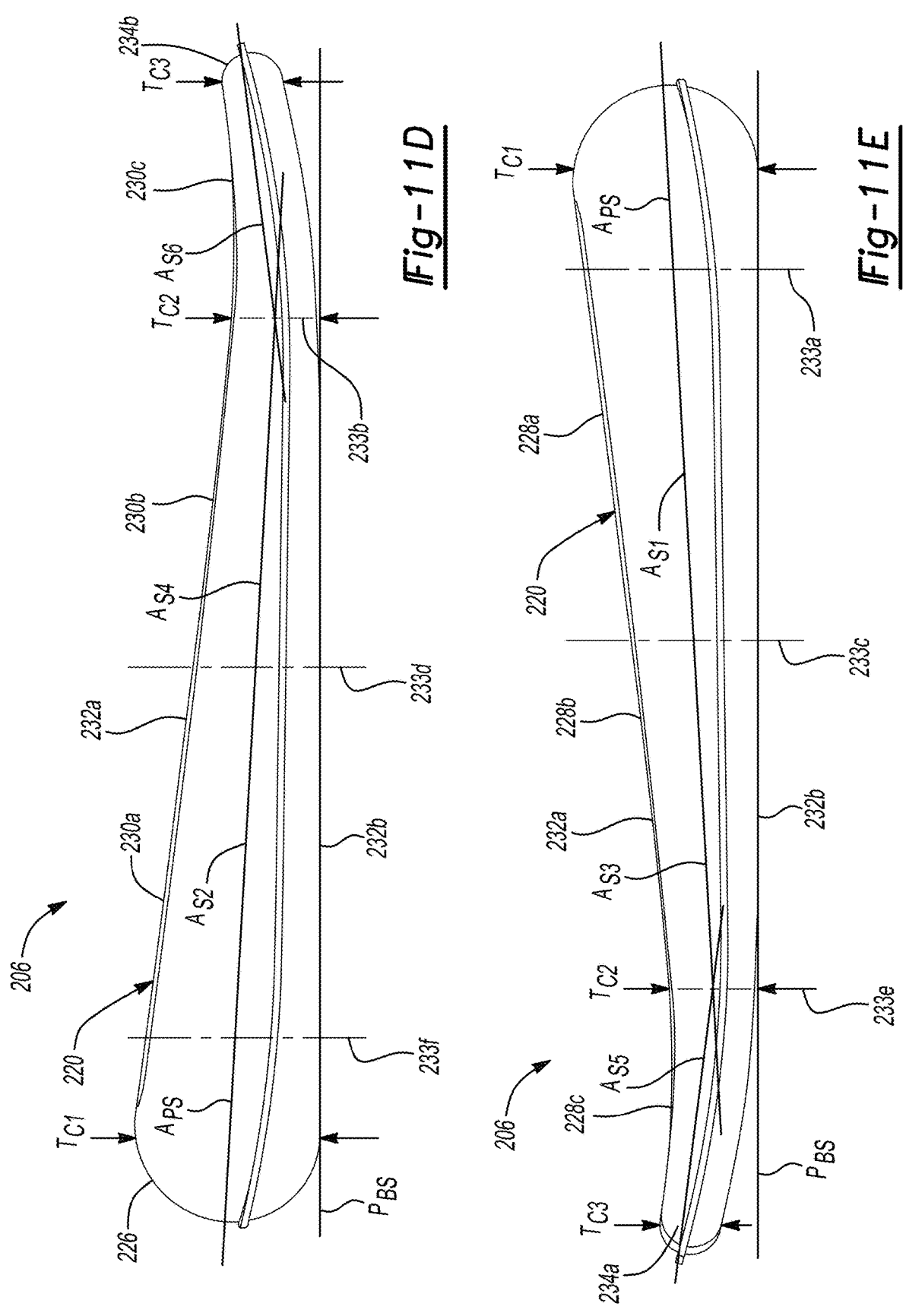
FIGS. 11D and 11E are medial and lateral side elevation views of the bladder of FIGS. 11A and 11B.

With continued reference to FIG. 11C, the medial forefoot segment 228c extends along a fifth longitudinal segment axis $A_{S5}$ from the fifth transition 233e in the forefoot region 12 to the first terminal end 234a in the forefoot region 12. As shown in FIG. 11D, the fifth longitudinal segment axis $A_{S5}$ converges with the longitudinal axis $A_F$ of the article of footwear 10 along the direction from the fifth transition 233e to first terminal end 234a. Similarly, the lateral forefoot segment 230c extends along a sixth longitudinal segment axis $A_{S6}$ from the sixth transition 233f in the forefoot region 12 to the second terminal end 234b in the forefoot region 12. The sixth longitudinal segment axis $A_{S7}$ converges with the longitudinal axis $A_F$ of the article of footwear 10 in a direction from the sixth transition 233f to the second terminal end 234b. Accordingly, the medial forefoot segment 228c and the lateral forefoot segment 230c converge with each other along the direction from the forefoot region 12 to the anterior end 18, whereby the overall width W of the fluid-filled chamber 220 tapers from the third width $W_3$ across the fifth and sixth transitions 233c, 233f to a fourth width $W_4$ across the terminal ends 234a, 234b.

As shown in FIGS. 11D and 11E, the portions of the bottom surface 232b defined by the posterior segment 226, the heel segments 228a, 230a, and the mid-foot segments 228b, 230b are substantially aligned with each other to define a first reference plane PBS. In contrast, the forefoot segments 228c, 230c extend from the transitions 233e, 233f along an arcuate and inclined path, whereby the portions of the bottom surface 232b define by forefoot segments 228c, 230c extend away from the first reference plane PBS. Accordingly, while the axes $A_{PS}$, $A_{S1\text{-}S4}$ extend along a common angle with respect to the bottom surface reference plane PBS, the axes $A_{S5}$. $A_{S6}$ extend at an incline relative to the bottom surface reference plane PBS. Put another way, each of the posterior segment 226, the heel segments 228a, 230a, and the mid-foot segments 228b, 230b are aligned along a common plane, while the forefoot segments 228c, 230c extend in the same direction from the plane along a curved path. Accordingly, when incorporated into the article of footwear 10, the forefoot segments 228c, 230c will extend away from the ground surface along the curved path.

Referring now to FIG. 5-9, the fluid-filled chamber 220 is tubular and defines a substantially circular cross-sectional shape. Accordingly, inside diameters $D_{C1\text{-}C5}$ of interior void 231 correspond to an outer thickness $T_C$ of the fluid-filled chamber 220. The thickness $T_C$ of the fluid-filled chamber 220 is defined by a maximum distance between the upper surface 232a of the upper barrier layer 218a and the lower surface 232b of the lower barrier layer 218b. With reference to FIGS. 11D and 11E, the thickness Tc of the fluid-filled chamber 220 tapers continuously from the posterior segment 226 to the terminal ends 234a, 234b. Particularly, the fluid-filled chamber 220 tapers continuously and at a first rate from a first thickness $T_{C1}$ at the posterior end 20 to a second thickness $T_{C2}$ across the fifth transition 233c and the sixth transition 233f. Accordingly, the portion of the fluid-filled chamber 220 formed by the posterior segment 226, the heel segments 228a, 230a, and the mid-foot segments 228b, 230b has a continuous and constant taper from the first thickness $T_{C1}$ to the second thickness $T_{C2}$. The forefoot segments 228c, 230c also taper continuously at a second rate from the respective fifth and sixth transitions 233e, 233f to the respective terminal ends 234a, 234b. The forefoot segments 228c, 230c may taper at a variable rate, whereby a first portion of the forefoot segments 228c, 230c extending from the fifth and sixth transitions 233c, 233f tapers at a greater rate than a second portion of the forefoot segments 228c, 230c extending to the terminal ends 234a, 234b.

Each of the segments 226, 228a-228c, 230a-230c may be filled with a pressurized fluid (i.e., gas, liquid) to provide cushioning and stability for the foot during use of the footwear 10. In some implementations, compressibility of a first portion of the plurality of segments 226, 228a-228c, 230a-230c under an applied load provides a responsive-type cushioning, while a second portion of the segments 226, 228a-228c, 230a-230c may be configured to provide a soft-type cushioning under an applied load. Accordingly, the segments 226, 228a-228c, 230a-230c of the fluid-filled chamber 220 may cooperate to provide gradient cushioning to the article of footwear 10 that changes as the applied load changes (i.e., the greater the load, the more the segments 226, 228a-228c, 230a-230c are compressed and, thus, the more responsive the footwear 10 performs). In some implementations, the segments 226, 228a-228c, 230a-230c are in fluid communication with one another to form a unitary pressure system for the fluid-filled chamber 220. The unitary pressure system directs fluid through the segments 226, 228a-228c, 230a-230c when under an applied load as the segments 226, 228a-228c, 230a-230c compress or expand to provide cushioning, stability, and support by attenuating ground-reaction forces especially during forward running movements of the footwear 10.

With reference to FIGS. 11A and 11B, the web area 222 is formed at a bonded region of the upper barrier layer 218a and the lower barrier layer 218b, and extends between the medial heel segment 228a and the lateral heel segment 230a from the posterior segment 226 to a terminal edge 236 located in the mid-foot region 14 of the sole structure 200. Particularly, the terminal edge 236 is substantially aligned with the third and fourth transitions 233c, 233d in the mid-foot region 14 of the sole structure 200. In the illustrated example, the web area 222 is disposed vertically intermediate with respect to the thickness T of the fluid-filled chamber 220. Accordingly, the web area 222 cooperates with the heel segments 228a, 230a to define an upper pocket 238 and a lower pocket 240 for receiving portions of the inner cushion 208 and the lower cushion 212, respectively.

The web area 222 includes an inflation conduit 242 configured to provide a fluid passage between a mold cavity (not shown) and the interior of the fluid-filled chamber 220. The inflation conduit 242 extends from an inlet 244 formed adjacent to the terminal edge 236 of the web area 222 to one of segments 226, 228a, 230a of the fluid-filled chamber 220 disposed in the heel region 16 of the sole structure 200. In the illustrated example, the conduit 242 includes a first segment 246a extending from the inlet 244 to an intermediate region of the web area 222, and a second segment 246b extending from the first segment 246a to the medial heel segment 228a of the fluid-filled chamber 220. In some examples, the web area 222 includes a tab 248 extending towards the anterior end 18 from the terminal edge 236. The inlet 244 and a portion of the first segment 246a are formed on the tab 246. Additionally, the inlet 244 may include a crimped region 251 formed on the tab 248 for sealing the inflation conduit 242 during the molding process, thereby preventing the escape of the pressurized fluid from within the fluid-filled conduit once a desired pressure is achieved.

In some implementations, the upper and lower barrier layers 218a, 218b are formed by respective mold portions each defining various surfaces for forming depressions and pinched surfaces corresponding to locations where the web area 222 and/or the peripheral seam 224 are formed when the lower barrier layer 218b and the upper barrier layer 218a are joined and bonded together. In some implementations, adhesive bonding joins the upper barrier layer 218a and the lower barrier layer 218b to form the web area 222 and the peripheral seam 224. In other implementations, the upper barrier layer 218a and the lower barrier layer 218b are joined to form the web area 222 and the peripheral seam 224 by thermal bonding. In some examples, one or both of the barrier layers 218a, 218b are heated to a temperature that facilitates shaping and melding. In some examples, the barrier layers 218a, 218b are heated prior to being located between their respective molds. In other examples, the mold may be heated to raise the temperature of the barrier layers 218a, 218b. In some implementations, a molding process used to form the fluid-filled chamber 220 incorporates vacuum ports within mold portions to remove air such that the upper and lower barrier layers 218a, 218b are drawn into contact with respective mold portions. In other implementations, fluids such as air may be injected into areas between the upper and lower barrier layers 218a, 218b such that pressure increases cause the barrier layers 218a, 218b to engage with surfaces of their respective mold portions.

Figure 12A:
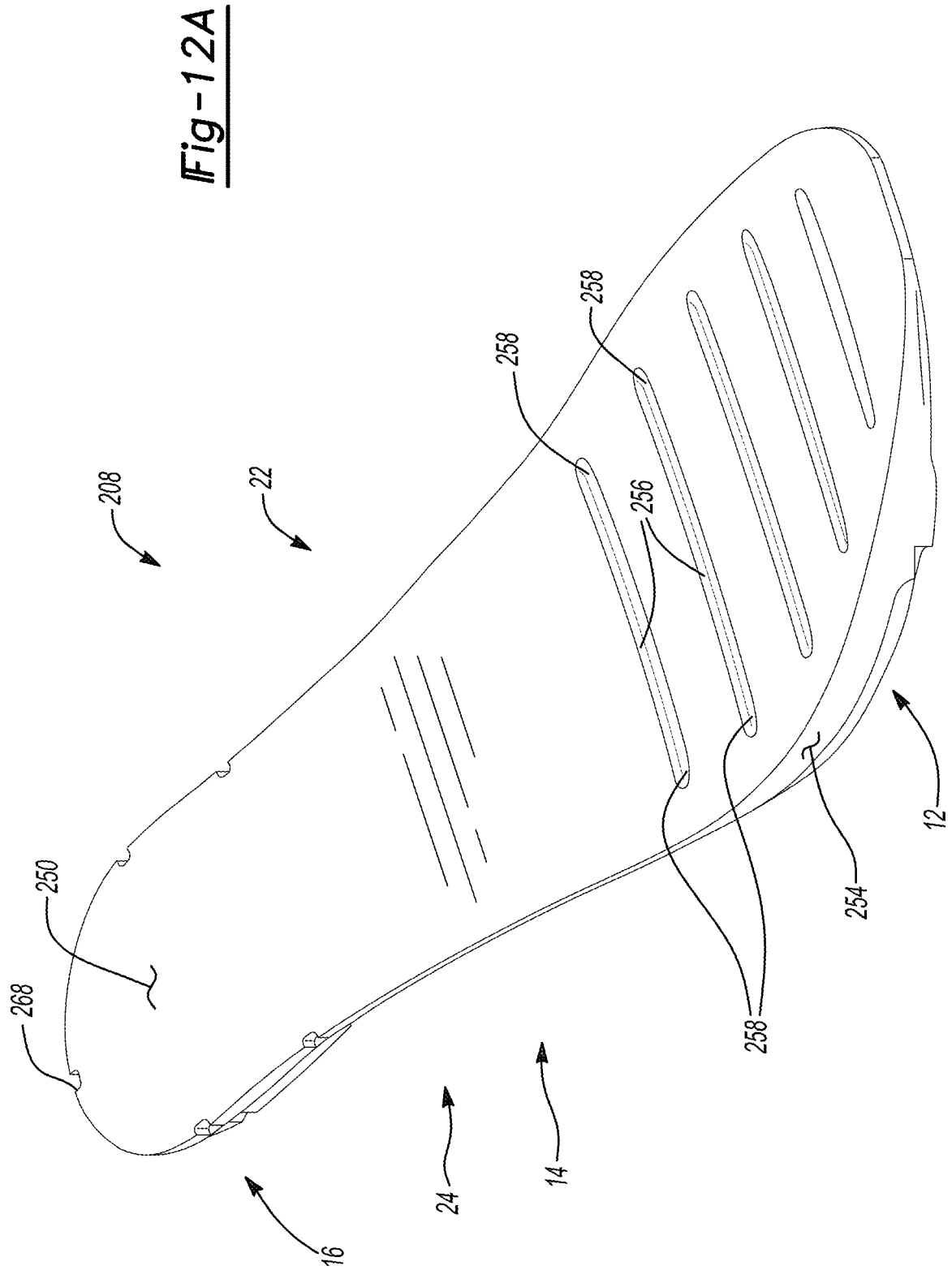
FIGS. 12A and 12B are top and bottom perspective views of an inner cushion of the article of footwear of FIG. 1.
Figure 12B:
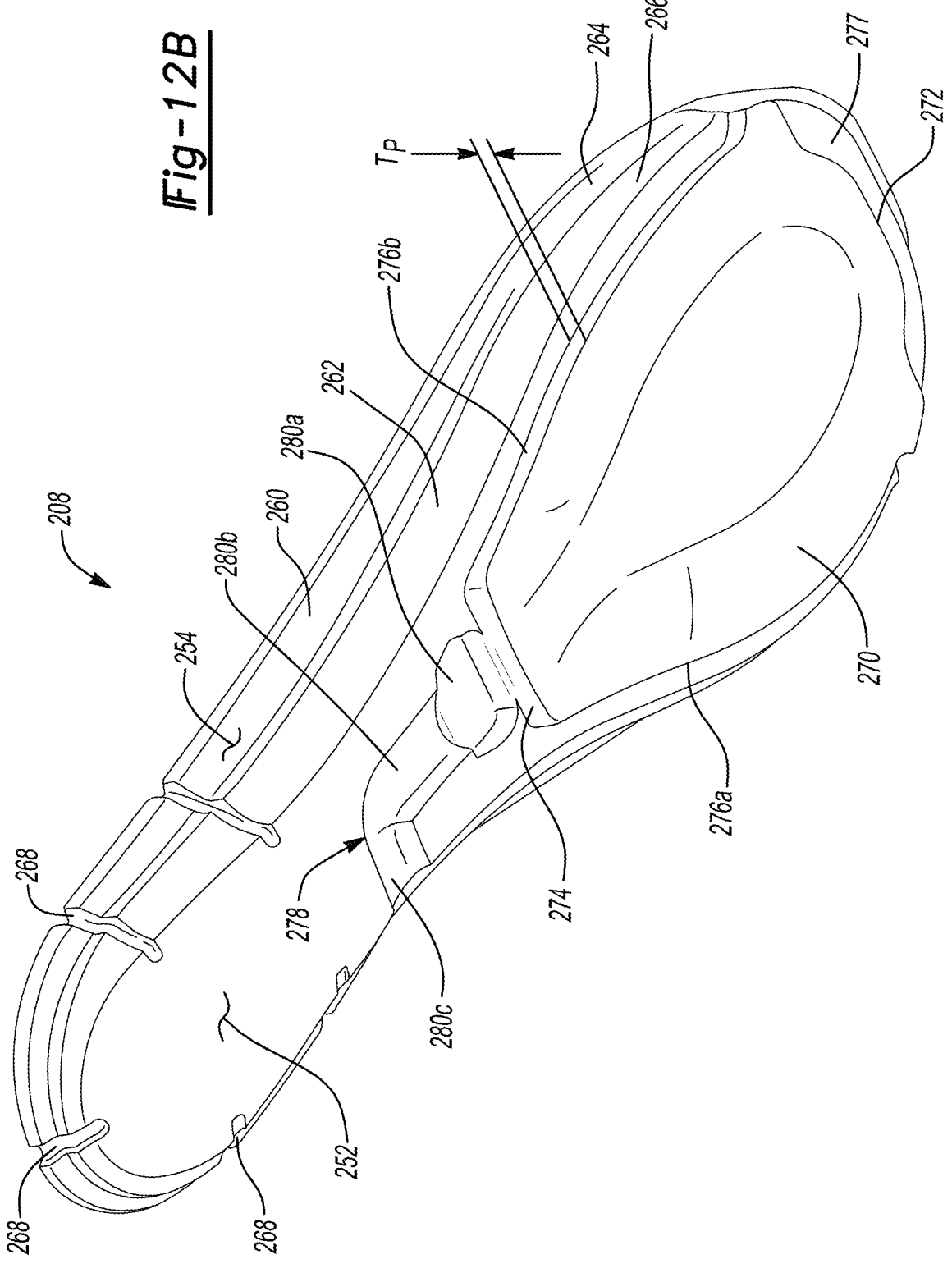

Turning now to FIGS. 12A and 12B, the inner cushion 208 includes a top surface 250 and a bottom surface 252 formed on an opposite side of the inner cushion 208 from the top surface 250. A peripheral surface 254 extends between the top surface 250 and the bottom surface 252, and is configured to cooperate with an inner periphery of the fluid-filled chamber 220. The top surface 250 of the inner cushion 208 defines a profile of the interior region 28 of the footbed 106, and may be contoured to correspond to a shape of the foot. The top surface 250 may further include a plurality of elongate channels 256 formed in the forefoot region 12 thereof. As shown, the channels 256 are evenly spaced along the forefoot region 12 and each extend from a first terminal end 258 adjacent to the medial side 22 to a second terminal end 258 adjacent to the lateral side 24.

With reference to FIG. 12B, the outer peripheral surface 254 of the inner cushion 208 is configured to cooperate with each of the outer cushion 210 and the fluid-filled chamber 220 of the bladder 206. Particularly, the outer peripheral surface 254 includes an outer cushion groove 260 formed adjacent to the top surface 250 and an inner chamber groove 262 formed between the outer cushion groove 260 and the bottom surface 252. The outer cushion groove 260 extends continuously from a first end (not shown) in the forefoot region 12 on the medial side 22 and around the heel region 16 to a second end 264 in the forefoot region 12 on the lateral side 24. As shown in FIGS. 5-10, a cross-sectional shape of the outer cushion groove 260 has an arcuate profile and corresponds in shape to an inner periphery of the outer cushion 210, as discussed in greater detail below.

Figure 5:
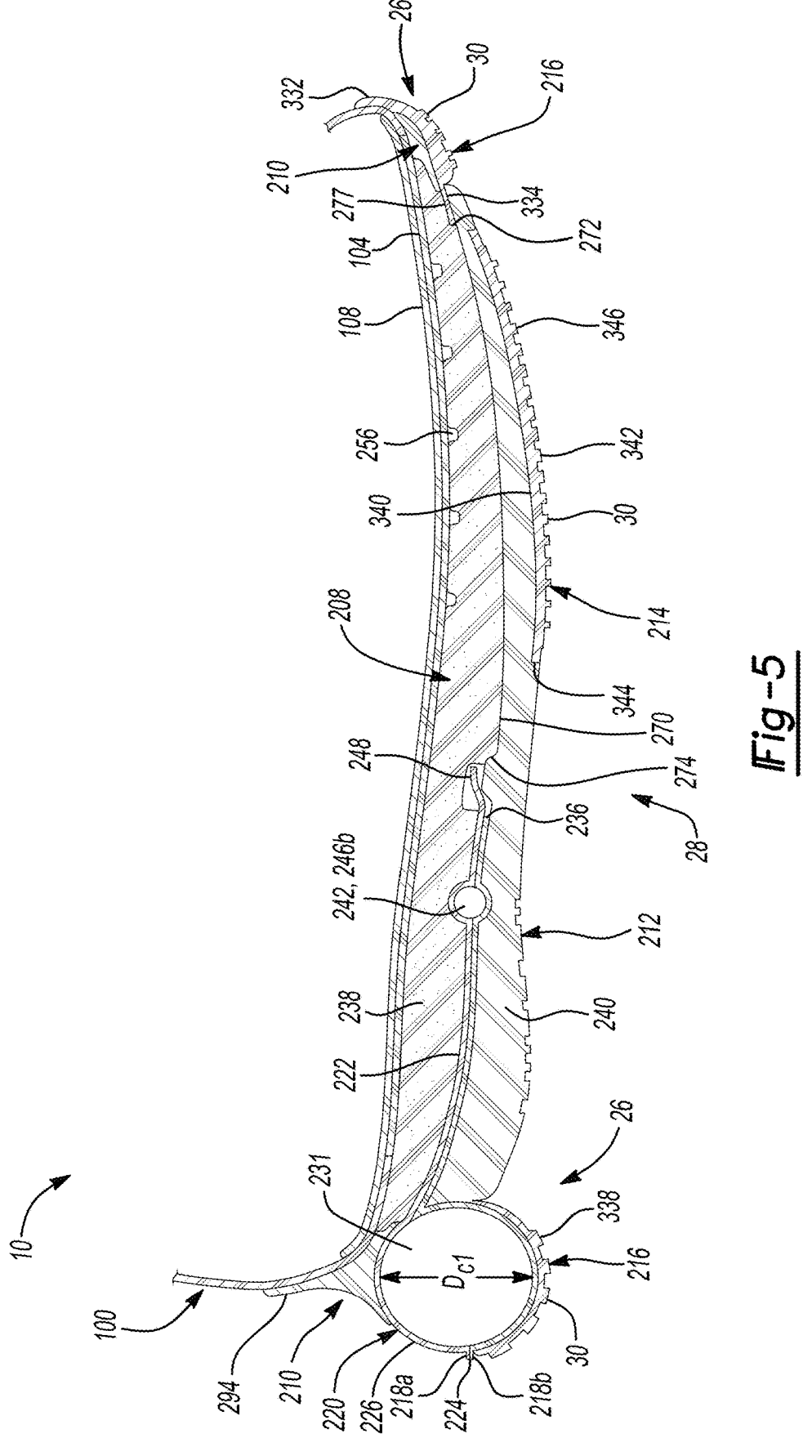
FIG. 5 is a cross-sectional view of the article of footwear of FIG. 1, taken along line 5-5 of FIG. 3 and corresponding to a longitudinal axis of the article of footwear.

With continued reference to FIG. 12B, the inner chamber groove 262 extends from a first end (not shown) in the forefoot region 12 on the medial side 22 and around the heel region 16 to a second end 266 in the forefoot region 12 on the lateral side 24. As shown in FIGS. 5-9, a cross-sectional shape of the inner chamber groove 262 is concave and corresponds to a circumference of the upper surface 232a of the fluid-filled chamber 220. Although the inner chamber groove 262 is continuously concave along its length, a radius of the inner chamber groove 262 is variable and is config-ured to accommodate the tapered thicknesses Tc of the fluid-filled chamber 220, as discussed above. For example, as shown in FIG. 5, the inner chamber groove 262 has first radius in the heel region 12 corresponding to a thickness $T_C$ or diameter of the fluid-filled chamber 220 at the posterior end 20. Similarly, as shown in FIGS. 6-9, the radius of the inner chamber groove 262 progressively decreases from the heel region 16 to the forefoot region 12 to accommodate the changes in thickness Tc of the fluid-filled chamber 220. When the sole structure 200 is assembled, the inner chamber groove 262 receives an inner peripheral portion of the upper surface 232a of the fluid-filled chamber 220, whereby the inner cushion 208 is disposed between the segments 226, 228a-228c, 230a-230c of the fluid-filled chamber 220 above the seam 224 and the web 222.

Referring still to FIG. 12B, the outer peripheral surface 254 may include a plurality of elongate grooves 268 extend-ing vertically from the top surface 250 to the bottom surface 252. In the illustrated example, the grooves 268 are formed in the heel region and include a first pair of grooves 268 spaced apart from each other on the medial side 22, a second pair of grooves 268 spaced apart from each other on the lateral side 24, and a fifth groove 268 formed at the posterior end of the inner cushion 208.

Figures 7, 8:
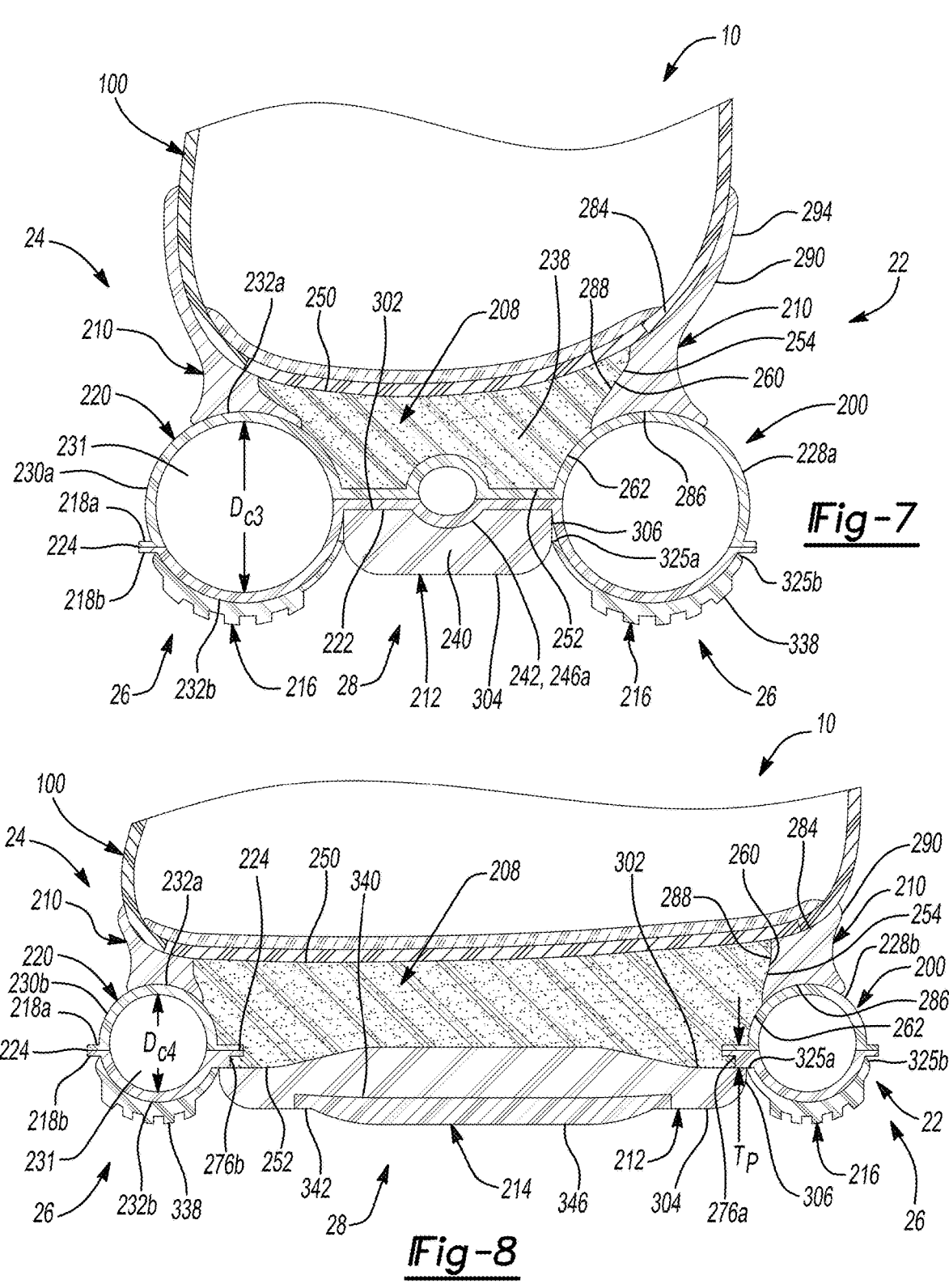
FIG. 7 is a cross-sectional view of the article of footwear of FIG. 1, taken along line 7-7 of FIG. 3 and corresponding to third and fourth transitions of the fluid-filled chamber.
FIG. 8 is a cross-sectional view of the article of footwear of FIG. 1, taken along line 8-8 of FIG. 3 and corresponding to fifth and sixth transitions of the fluid-filled chamber.
Figure 9:
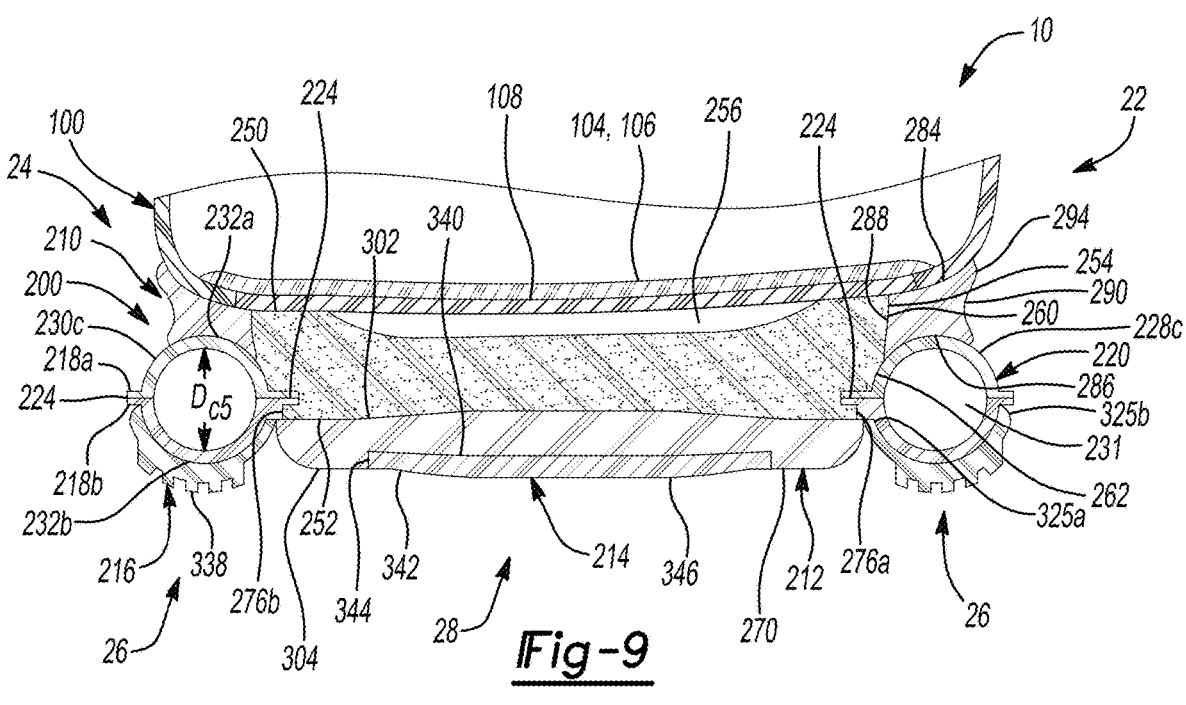
FIG. 9 is a cross-sectional view of the article of footwear of FIG. 1, taken along line 9-9 of FIG. 3 and corresponding to terminal ends of the fluid-filled chamber.
Figure 10:
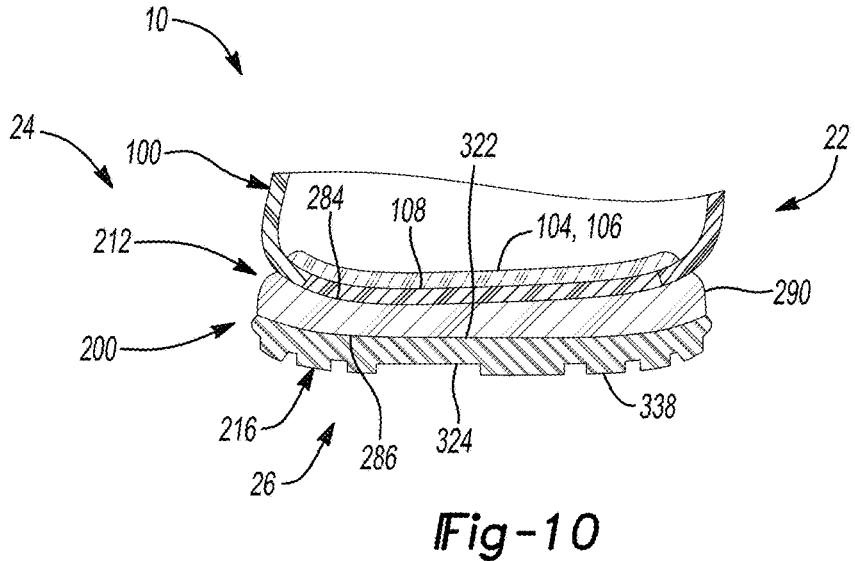
FIG. 10 is a cross-sectional view of the article of footwear of FIG. 1, taken along line 10-10 of FIG. 3 and corresponding to a toe portion of the article of footwear.

With reference to FIG. 12B, the bottom surface 252 of the inner cushion 208 is configured to cooperate with the bladder 206, whereby the bottom surface 252 includes a plurality of features for receiving corresponding elements of the bladder 206. In the illustrated example, the bottom surface 252 includes a forefoot pad 270 configured to be received between the portions of the peripheral seam 224 that extends along the inner periphery of the mid-foot segments 228b, 230b and the forefoot segments 228c, 230c. Accordingly, as shown in the cross-sectional view of FIGS. 8 and 9, a thickness $T_P$ of the forefoot pad 270 corresponds to a thickness of the peripheral scam 224 such that the portion of the bottom surface 252 of the inner cushion 208 defined by the forefoot pad 270 is substantially flush with a bottom surface of the peripheral seam 224. Referring to the cross-sectional view of FIGS. 5 and 12B, the forefoot pad 270 extends from a first end 272 at the forefoot region 12 of the sole structure 200 to a second end 274 in the mid-foot region 14. The second end 274 opposes the terminal edge 236 of the web area 222, and more specifically, a terminal edge of the tab 248. Because the forefoot pad 270 is configured to be received between the peripheral seam 224 of the bladder 206, medial and lateral sidewalls 276a, 276b of the forefoot pad 270 are offset inwardly from a lower edge of inner chamber groove 262, whereby the space between the inner chamber groove 262 and the sidewalls 276a, 276b of the forefoot pad 270 is configured to receive the periph-eral seam 224 therein, as shown in FIGS. 8 and 9.

With continued reference to FIG. 12B, the bottom surface 252 of the inner cushion 208 includes an upper recess 278 configured to receive the portion of the inflation conduit 242 formed on a top surface of the web area 222. Accordingly, the upper recess 278 includes first portion 280a configured to receive the tab 248 and the inlet 244, a second portion 280b extending from the first portion 280a to an interior portion of the bottom surface 252 and configured to receive the first segment 246a of the inlet 244, and a third portion 280c extending from the second portion 280b to the periph-eral surface on the medial side 22 and configured to receive the second segment 246b of the inlet 244.

Figure 13A:
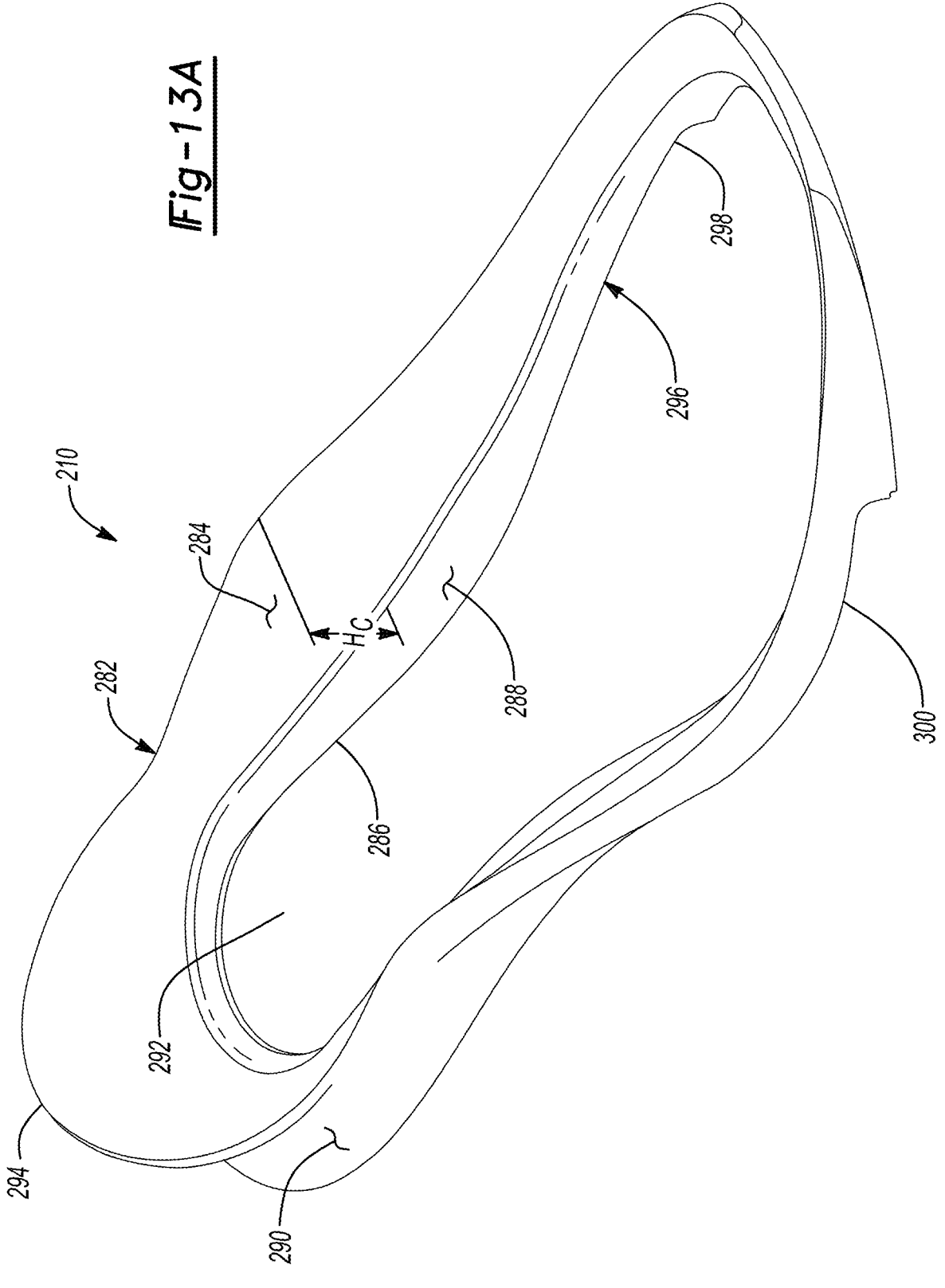
FIGS. 13A and 13B are top and bottom perspective views of an outer cushion of the article of footwear of FIG. 1.
Figure 13B:
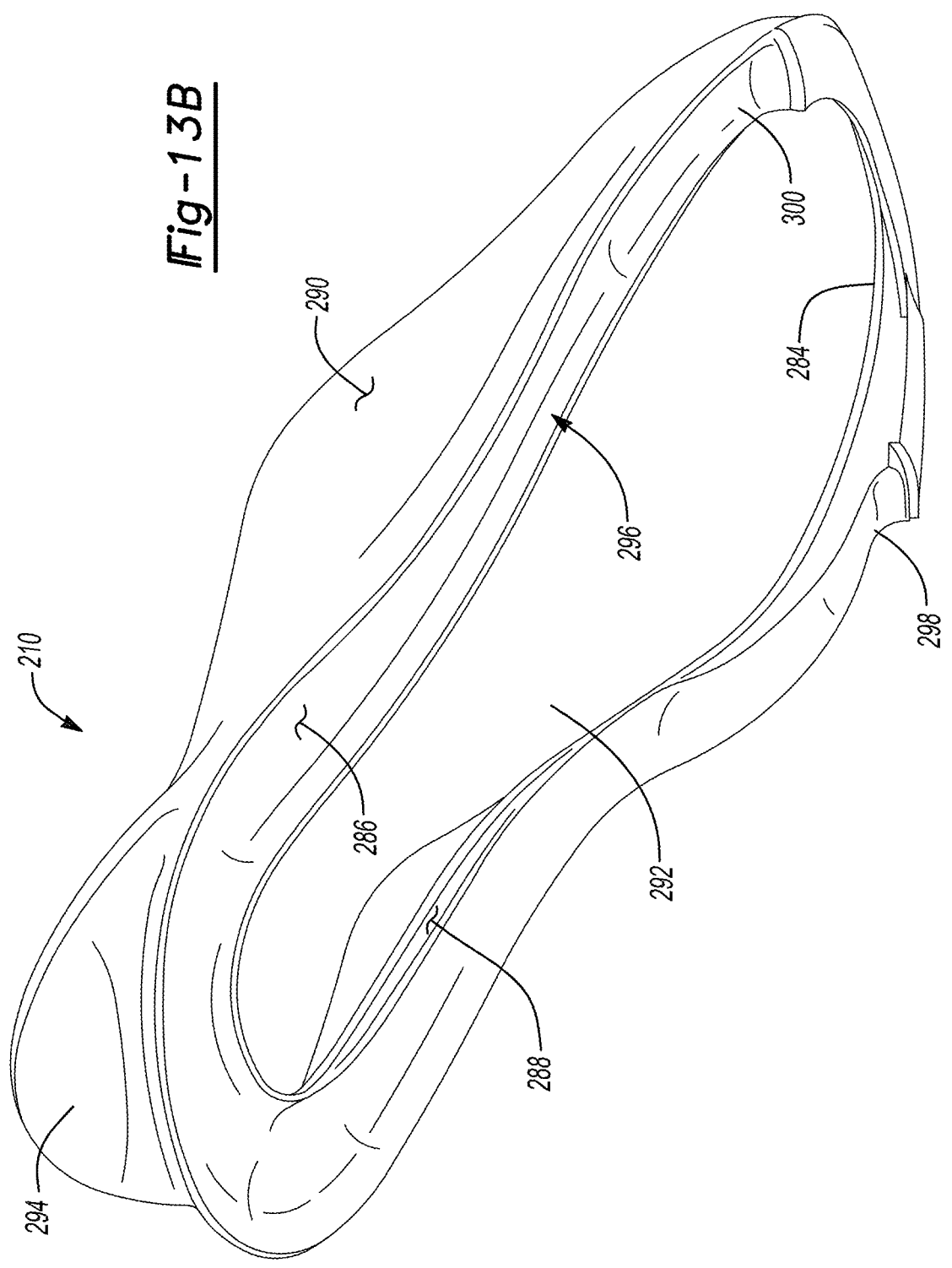

Turning now to FIGS. 13A and 13B, the outer cushion 210 is configured to cooperate with each of the bladder 206 and the inner cushion 208, and forms an upper portion of the midsole 202 along the peripheral region 26 of the sole structure 200. As shown, the outer cushion 210 includes a continuously formed sidewall 282 including a top surface 284 and a bottom surface 286 disposed on an opposite side of the sidewall from the top surface 284. The sidewall 282 further includes an inner peripheral surface 288 and an outer peripheral surface 290 disposed on opposite sides of the sidewall from each other, and each extending from the top surface 284 to the bottom surface 286. The inner peripheral surface 288 defines an aperture 292 extending through the outer cushion 210 and configured to receive the inner cushion 208 therein. Accordingly, the inner peripheral sur-face 288 of the outer cushion 210 and the outer peripheral surface 254 of the inner cushion 208 cooperate with each other, whereby a cross-sectional profile of the outer periph-eral surface 254 complements a cross-sectional profile of the inner peripheral surface 288, as shown in FIGS. 6-9. When the sole structure 200 is assembled, the inner peripheral surface 288 of the outer cushion 210 opposes the outer peripheral surface 254 of the inner cushion 208 to form a continuous upper portion of the midsole 202.

As shown in FIGS. 5-9, the top surface 284 of the outer cushion 210 is arcuate and defines a portion of the footbed 106 in the peripheral region 26. Accordingly, the top surface 284 of the outer cushion 210 and the top surface 250 of the inner cushion 208 cooperate to define the footbed 106 of the sole structure 200. As shown in FIG. 1, the top surface 284 and the outer peripheral surface 290 of the outer cushion 210 cooperate to define a counter 294 extending around the outer periphery of the upper 100, whereby the top surface 284 is concave and extends onto the upper 100 to provide lateral support to the foot during side-to-side motion. In the illustrated example, a height $H_C$ of the counter 294 is variable along the peripheral region 26 to provide desired amounts of lateral support to the upper 100. For example, the height He of the counter 294 may be greater at the posterior end 20 and at the mid-foot region 14 than in the forefoot region 12 and the heel region 16.

As shown in FIGS. 13A and 13B, the bottom surface 286 of the outer cushion 210 includes an upper chamber groove 296 extending from a first end 298 on the medial side 22 in the forefoot region 12 and around the heel region 16 to a second end 300 on the lateral side 24 in the forefoot region 12. The upper chamber groove 296 is configured to cooperate with the inner chamber groove 262 of the inner cushion 208 to receive and support the upper surface 232b of the fluid-filled chamber 220. As shown in FIGS. 5-10, the upper chamber groove 296 of the outer cushion 210 and the surface of the inner chamber groove 262 are continuously formed with each other, whereby each of the upper chamber groove 296 and the inner chamber groove 262 have the same radius at respective locations along the sole structure 200. Referring to FIG. 13B, each of the first end 298 and the second end 300 of the upper chamber groove are hemispherical in shape, and are configured to receive upper portions of the respective terminal ends 234a, 234b of the fluid-filled chamber 220.

Figure 14A:
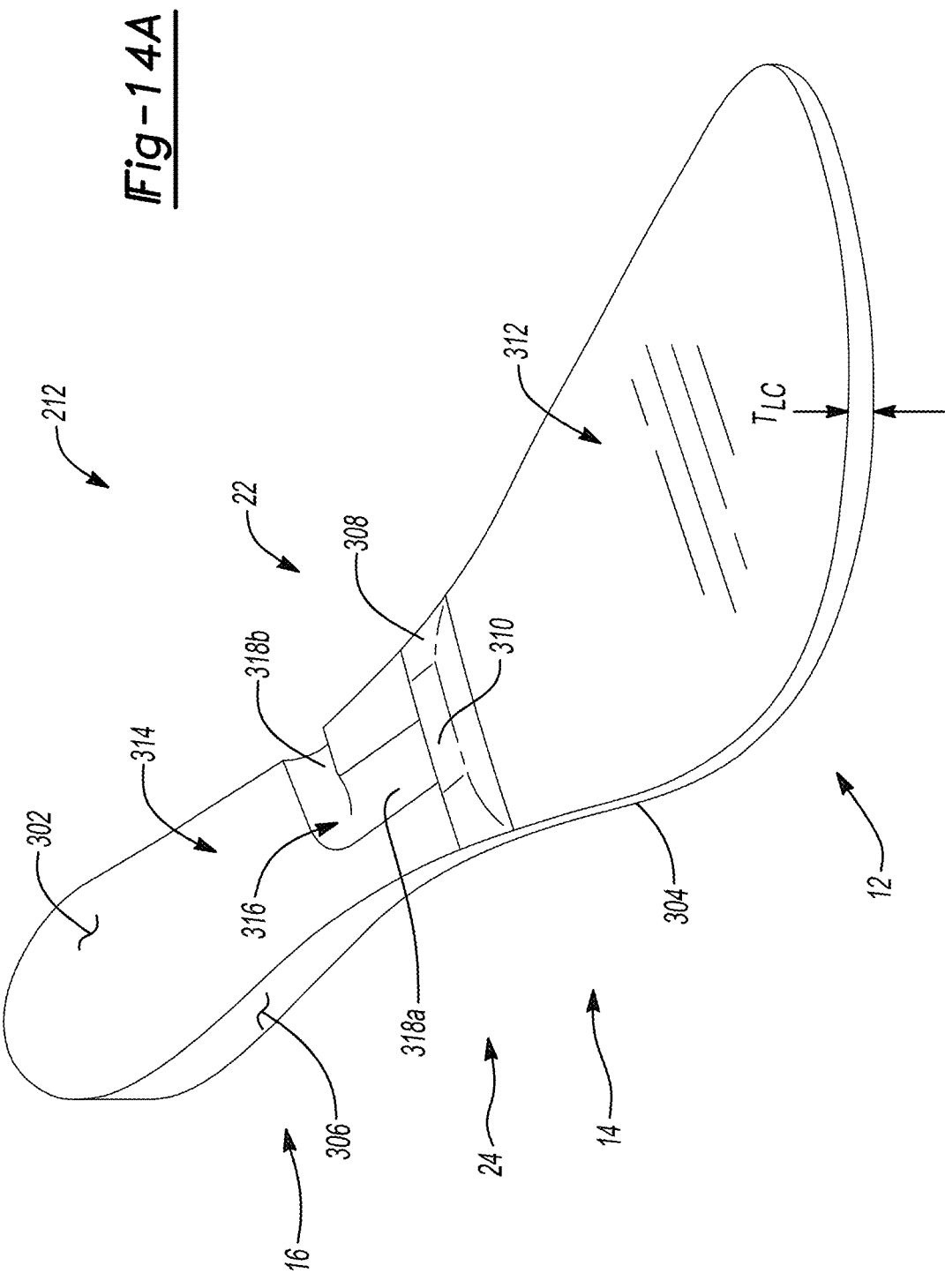
FIGS. 14A and 14B are top and bottom perspective views of a lower cushion of the article of footwear of FIG. 1.
Figure 14B:
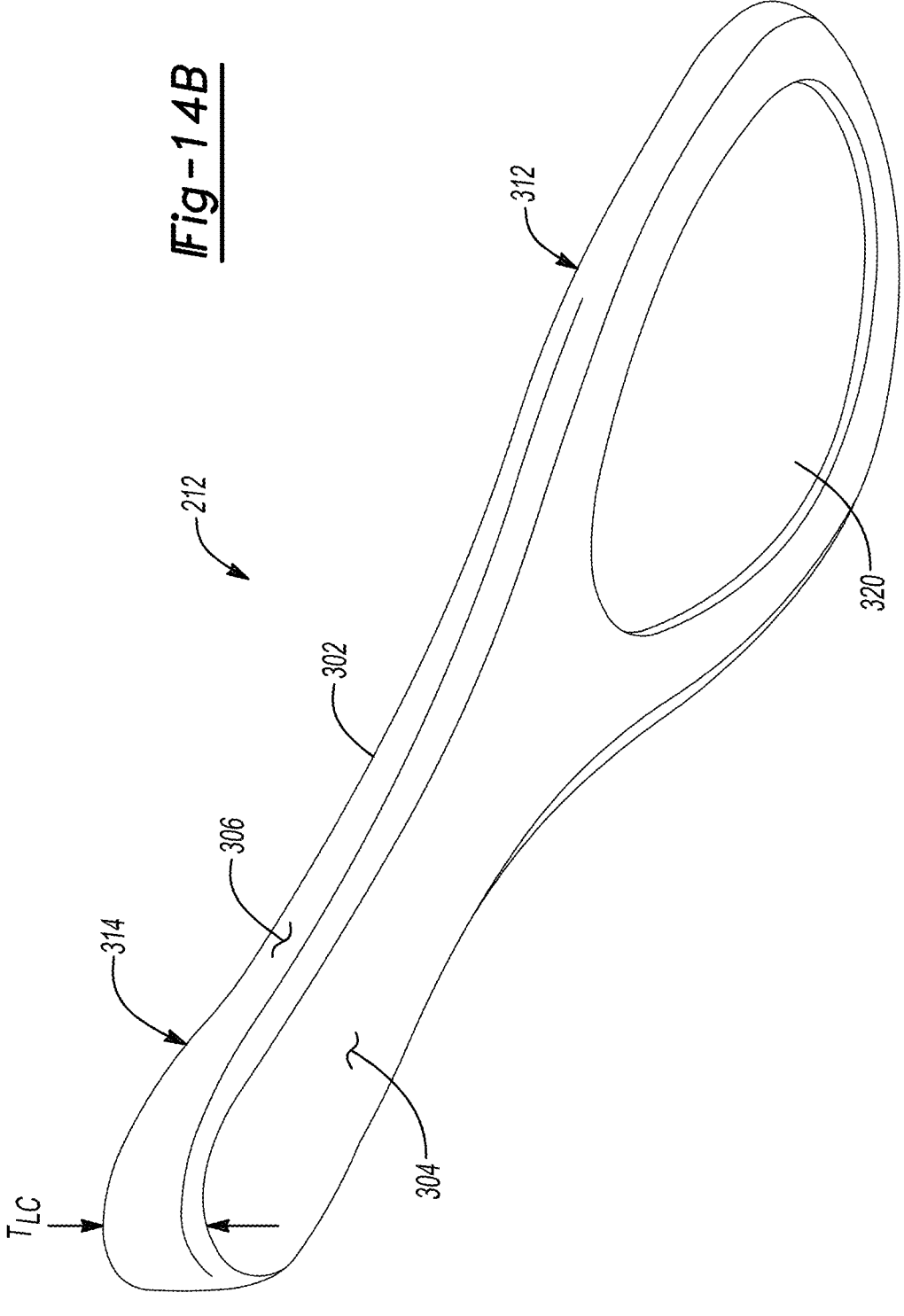

Referring to FIGS. 14A and 14B, the lower cushion 212 includes a top surface 302 and a bottom surface 304 formed on an opposite side of the lower cushion 212 from the top surface 302. A peripheral surface 306 extends from the top surface 302 to the bottom surface 304 and defines an outer perimeter of the lower cushion 212.

The top surface 302 of the lower cushion 212 includes a rib 308 disposed in the mid-foot region 14 and extending laterally across a width of the lower cushion 212 from the medial side 22 to the lateral side 24. The rib 308 has the shape of a truncated, rectangular pyramid, whereby a height of the rib 308 increases along a direction from the peripheral surface 306 to a peak 310 formed in the center of the lower cushion 212. As shown in the cross-sectional view of FIG. 5, the peak 310 of the rib 308 is configured to be received within the first portion 280a of the upper recess 278 formed in the bottom surface 252 of the inner cushion 208 to secure the tab 248 of the bladder 206 within the recess 278. Accordingly, a longitudinal position of the rib 308 corresponds to the longitudinal position of the third and fourth transitions 233c, 233d of the bladder 206 when the sole structure 200 is assembled.

The rib 308 effectively divides the lower cushion 212 into a forefoot portion 312 and a heel portion 314. As shown in FIGS. 5, 14A, and 14B, a thickness $T_{LC}$ of the lower cushion 212 may be variable in a direction along the longitudinal axis $A_F$ of the article of footwear 10, whereby the thickness $T_{LC}$ increases in a direction from the forefoot region 12 to the heel region 16. Accordingly, the heel portion 314 of the lower cushion 212 may have a greater thickness TLC than the forefoot portion 312.

The forefoot portion 312 of the lower cushion 212 is configured to be received between the mid-foot segments 228b, 230b and the forefoot segments 228c, 230c beneath the seam 224. Accordingly, the forefoot portion 312 opposes and interfaces with the forefoot pad 270 in the forefoot region 12 of the sole structure 200, whereby the peripheral seam 224 is disposed between the forefoot portion 312 of the lower cushion 212 and the bottom surface 252 of the inner cushion 208, as shown in FIGS. 5, 8, and 9.

Figure 6:
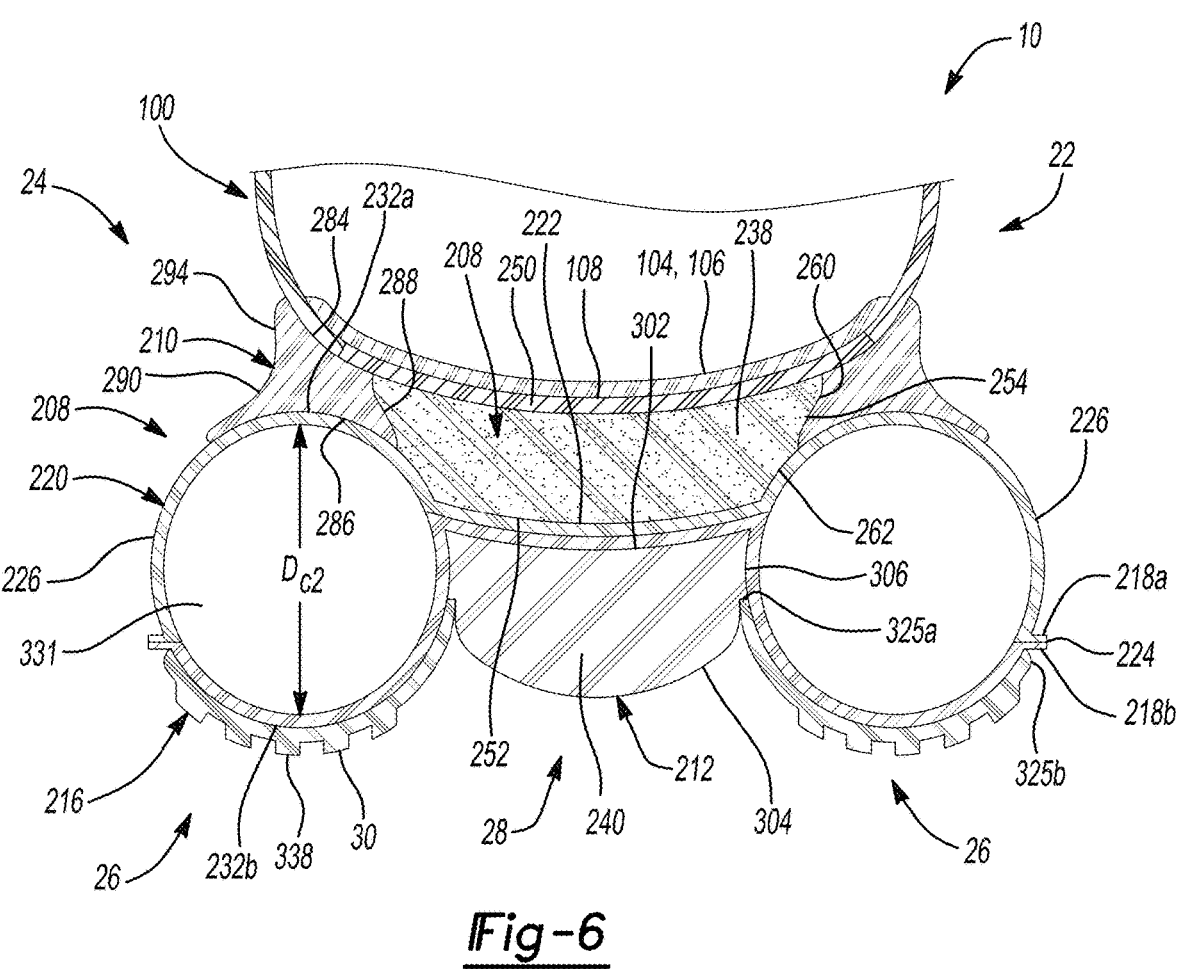
FIG. 6 is a cross-sectional view of the article of footwear of FIG. 1, taken along line 6-6 of FIG. 3 and corresponding to first and second transitions of the fluid-filled chamber.

The heel portion 314 of the lower cushion 212 is configured to be received within the lower pocket 240 formed in the heel region 16 of the fluid-filled chamber 220 by the posterior segment 226 and the heel segments 228a, 230a, and the web area 222, as shown in the cross-sectional views of FIGS. 5-7. Accordingly, the top surface 284 of the heel portion 314 opposes and interfaces with a bottom surface of the web area 222, while the peripheral surface 306 is surrounded by the posterior segment 226 and the heel segments 228a, 230a. As shown in FIGS. 5-7, the bottom surface 304 of the lower cushion 212 is spaced apart from the ground-engaging surface 30 in the heel region 16 of the sole structure, whereby the bladder 206 and the cushions 208, 210, 212 cooperate to form a trampoline-like sole structure 200 supported by the peripheral outsole 216 and the fluid-filled chamber 220.

With continued reference to FIG. 14A, the top surface 302 of the heel portion 314 includes a lower recess 316 configured to receive the portion of the inflation conduit 242 formed on a bottom surface of the web area 222. Thus, the lower recess 316 includes first portion 318a extending toward the heel region from the rib 308, and a second portion 318b extending from the first portion 318a to the peripheral surface 306 on the medial side 22 of the lower cushion. As shown, the web area 222 is interposed between the inner cushion 208 and the lower cushion 212 in the heel region 16 of the sole structure 200 to provide increased structural integrity between the bladder 206 and the remainder of the sole structure 200.

With reference to FIG. 14B, the bottom surface 286 of the lower cushion 212 includes an indentation 320 formed in the forefoot portion 312. As shown in FIGS. 3-5, 8, and 9, the indentation 320 is configured to receive the interior outsole 214 therein. In the illustrated example, a depth of the indentation 320 is less than an overall thickness of the of the interior outsole 214, whereby the interior outsole 214 protrudes from the indentation 320 to define a first portion of the ground-engaging surface 30 of the article of footwear 10.

As described above, each of the inner cushion 208, the outer cushion 210, and the lower cushion 212 are formed of a resilient polymeric material, such as foam or rubber, to impart properties of cushioning, responsiveness, and energy distribution to the foot of the wearer. In the illustrated example, the inner cushion 208 is formed of a first foam material, the outer cushion 210 is formed of a second foam material, and the lower cushion is formed of a third foam material. For example, the inner cushion 208 and the lower cushion 212 may be formed of foam materials providing greater cushioning and impact distribution, while the outer cushion 210 is formed of a foam material having a greater stiffness in order to provide increased lateral stiffness to the peripheral region 26 of the upper 100.

As described above, each of the inner cushion 208, the outer cushion 210, and the lower cushion 212 are desirably formed of a resilient polymeric material, such as a resilient foam or rubber, to impart properties of cushioning, responsiveness, and energy distribution to the foot of the wearer. In the illustrated example, the inner cushion 208 is formed of a first resilient polymeric material, the outer cushion 210 is formed of a second resilient polymeric material, and the lower cushion 212 is formed of a third resilient polymeric material.

Each of the cushion elements 208, 210, and 212 may independently be formed from a single unitary piece of resilient polymeric material, or may be formed of a plurality of elements each formed of one or more resilient polymeric materials. For example, the plurality of elements may be affixed to each other using a fusing process, using an adhesive, or by suspending the elements in a different resilient polymeric material. Alternatively, the plurality of elements may not be affixed to each other, but may remain independent while contained in one or more structures forming the cushioning element. In this alternative example, the plurality of independent cushioning elements may be a plurality of foamed particles, and may contained in a bladder or shell structure. As such, the cushioning element may be formed of a plurality of foamed particles contained within a relatively translucent bladder or shell formed of a film such as a barrier membrane.

In some aspects, the composition of the first, second, and third resilient polymeric materials (for cushioning elements 208, 210, and 212, respectively) may be substantially the same. Similarly, the average physical properties of the first, second, and third resilient polymeric materials, such as, for example, the average density, average stiffness, and/or average durometer, may be substantially the same.

Alternatively, the composition, physical property, or both, of at least one of the first, second, and third resilient polymeric materials may be different. For example, the inner cushion 208 and the lower cushion 212 may be formed of resilient polymeric materials providing greater cushioning and impact distribution, while the outer cushion 210 is formed of a resilient polymeric material having a greater stiffness in order to provide increased lateral stiffness to the peripheral region 26 of the upper 100.

Example resilient polymeric materials for cushioning elements 208, 210, and 212 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., cross-linked polyurethanes and/or thermoplastic polyurethanes). Examples of suitable polyurethanes include those discussed above for barrier layers 218a, 218b. Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a cross-linking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

Figure 15A:
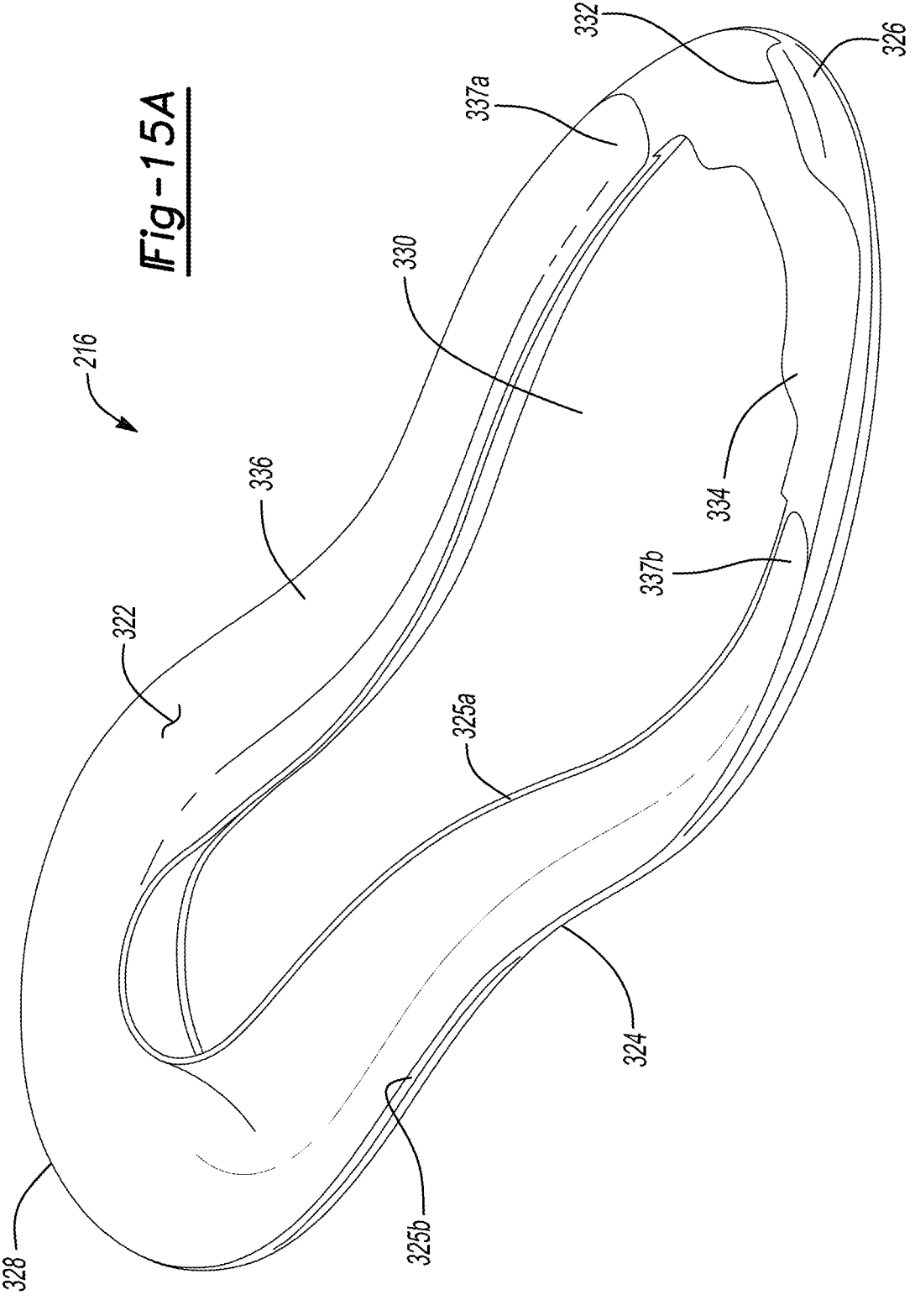
FIGS. 15A and 15B are top and bottom perspective views of a peripheral outsole of the article of footwear of FIG. 1.
Figure 15B:
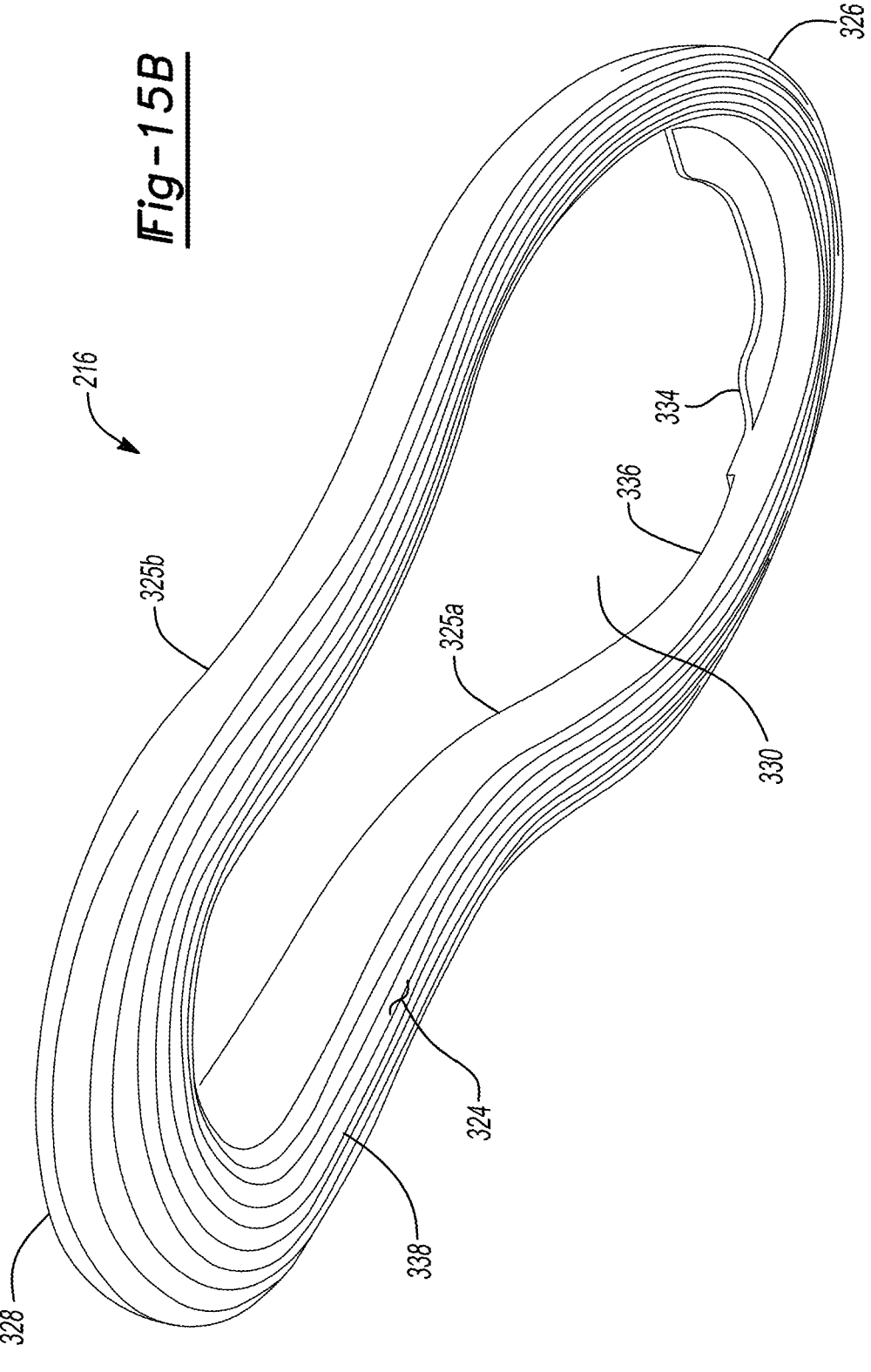

Referring now to FIGS. 15A and 15B, the peripheral outsole 216 includes a top surface 322 and a bottom surface 324 formed on an opposite side of the peripheral outsole 216 from the top surface 322. The peripheral outsole 216 further includes an inner peripheral edge 325*a* and an outer peripheral edge 325*b*, each extending between the top surface 322 and the bottom surface 324. The peripheral outsole 216 extends from a first end 326 to a second end 328, and is configured to extend continuously around the peripheral region 26 of the sole structure 200 to provide a first portion of the ground-engaging surface 30. Accordingly, the inner peripheral edge 325*a* of the peripheral outsole 216 defines an opening 330 in the interior region 28 of the sole structure 200 for exposing the lower cushion 212 and the interior outsole 214. The first end 326 of the peripheral outsole 216 includes a toe cap 332, which extends over the anterior end 18 of the upper 100, as shown in FIG. 5.

The first end 326 of the peripheral outsole 216 further includes flange 334 extending inwardly from the inner peripheral edge 325*a* of the peripheral outsole 216, opposite the toe cap 332. As shown in FIG. 5, when the sole structure 200 is assembled, the flange 334 is received within a notch 277 formed adjacent to the first end 272 of the forefoot pad 270, whereby the flange 334 opposes the first end 272 of the forefoot pad 270 of the inner cushion 208, and is interposed between the inner cushion 208 and the lower cushion 212 in the forefoot region 12. Accordingly, the flange 334 functions to secure the first end 326 of the peripheral outsole 216 to the sole structure 200 in the forefoot region 12.

With continued reference to FIG. 15A, the top surface 322 of the peripheral outsole 216 defines a bottom conduit channel 336 extending continuously from a first end 337*a* on the medial side 22 of the forefoot region 12 and around the heel region 16 to a second end 337*b* on the lateral side 24 of the forefoot region 12. Accordingly, the bottom conduit channel 336 is configured to receive an entire length of the lower surface 232*b* of the fluid-filled chamber 220, from the first terminal end 334*a* to the second terminal end 334*b*. As shown in FIGS. 5-9, the portion of the outer peripheral edge 325*b* bounding the bottom conduit channel 336 is configured to abut a bottom surface of the peripheral seam 224 of the bladder 206 along an outer periphery of the fluid-filled chamber 220. Accordingly, the outer peripheral edge 325*b* of peripheral outsole 216 and the peripheral seam 224 are substantially continuous, such that the peripheral seam 224 is indistinguishable from the outer peripheral edge 325*b*. The inner peripheral edge 325*a* extends upwardly along the fluid-filled chamber 220 and is disposed between the fluid-filled chamber 220 and the lower cushion 212. Thus, when the sole structure 200 is assembled, the inner peripheral edge 325*a* is concealed within the sole structure 200.

The bottom surface 324 of the peripheral outsole 216 includes a plurality of traction elements 338 formed thereon for improving engagement between the ground surface and the sole structure 200. In the illustrated example, the traction elements 338 are formed as elongate ribs 338 extending continuously along the bottom surface 324 of the peripheral outsole 216.

Referring to FIGS. 2-5, the interior outsole 214 has a top surface 340 and a bottom surface 342 formed on an opposite side from the top surface 340. A peripheral surface 344 extends from the top surface 340 to the bottom surface 342 and defines a peripheral profile of the interior outsole 214.

Figure 4:
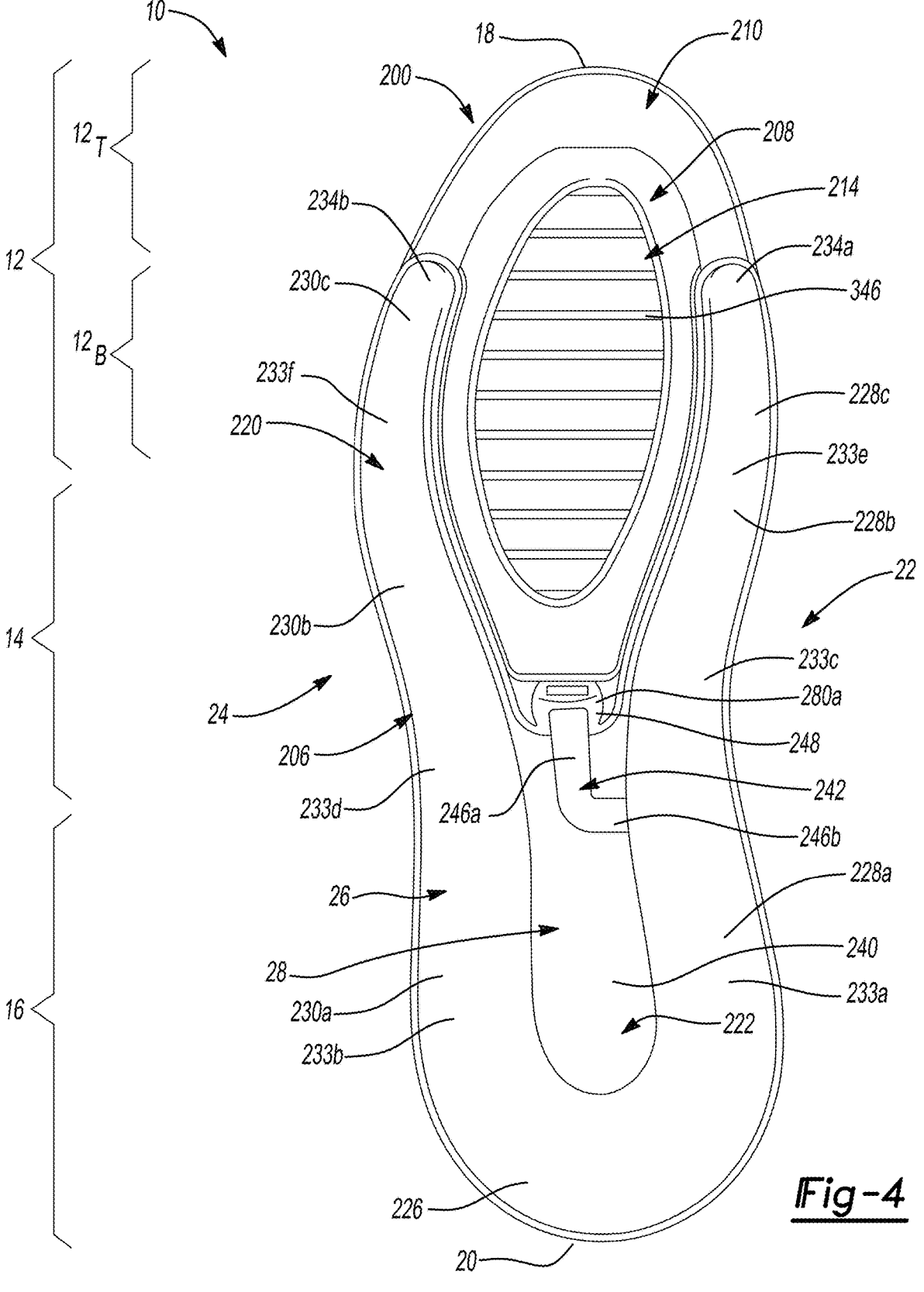
FIG. 4 is a bottom perspective view of a sole structure of the article of footwear of FIG. 1, where a portion of an outsole has been removed to show a profile of a fluid-filled chamber in accordance with the principles of the present disclosure.

As provided above, the interior outsole 214 is configured to be disposed within the indentation 320 of the lower cushion 212 when the sole structure 200 is assembled. Accordingly, the peripheral profile of the interior outsole 214 corresponds to a peripheral profile of the indentation 320. As shown in FIGS. 3-5, the bottom surface 342 of the interior outsole 214 includes a plurality of traction elements 346 formed thereon. In the illustrated example, the traction elements 346 are elongate ribs 346 extending along a direction from the medial side 22 to the lateral side 24. A thickness of the ribs 346 may taper from the center of the interior outsole 214 to the peripheral region 26, as shown in the cross-sectional views of FIGS. 8 and 9.

The interior outsole 214 and the peripheral outsole 216 are formed of resilient materials configured to impart properties of abrasion resistance and traction to the sole structure 200. In the illustrated example, the peripheral outsole 216 is formed of a first material having a higher durometer than the interior outsole 216. For example, the peripheral outsole 216 may be formed of a rubber material having a first durometer, while the interior outsole 214 is formed of a foam material having a second durometer, less than the first durometer.

As shown in the figures, when the sole structure 200 is assembled, the bottom surface 304 of the lower cushion 212 is spaced apart from the ground-engaging surface 30 defined by the outsoles 214, 216. As discussed above, the interior outsole 214 is joined to the indentation 320 formed in the bottom surface 304 of the lower cushion 212 in the forefoot region 12, and cooperates with the peripheral outsole 216 to define the ground-engaging surface 30 of the sole structure 200 in the forefoot region 12. Accordingly, the lower cushion 212 and the fluid-filled chamber 220 of the bladder 206 cooperate to provide support across the forefoot region 12. In contrast, the heel region 16 of the sole structure 200 is supported entirely by the fluid-filled chamber 220, whereby the heel portion 314 of the lower cushion 212 is spaced apart from the ground-engaging surface 30 and cooperates with the web area 222 to provide a trampoline-like structure. Thus, in use, the sole structure 200 is configured to provide increased shock absorption in the heel region 16 by allowing the forces associated with an initial ground contact in the heel region to be received and distributed by the fluid-filled chamber 220. As the foot rolls forward to the forefoot region 12, the ground impact forces are more evenly distributed across the fluid-filled chamber 206 and the cushions 210, 212, 214. Furthermore, by forming the cushions 210, 212, 214 as individual subcomponents, performance characteristics of the sole structure 200 can be more finely tuned to accommodate varying forces associated with the different regions 12, 14, 16, 26, 28 of the sole structure 200. For example, the inner cushion 208 may be formed of a first material for absorbing impact, the outer cushion 210 may be formed of a second material for providing responsiveness and support, and the lower cushion 212 may be formed of a third material for providing a desired level of longitudinal stiffness.

The following Clauses provide an exemplary configuration for a bladder for an article of footwear described above.

Clause 1: A bladder for an article of footwear, the bladder comprising a chamber including (i) an arcuate segment extending from a first transition to a second transition, (ii) a first plurality of elongate segments extending in a first direction from the first transition to a first terminal end, and (iii) a second plurality of elongate segments spaced apart from the first plurality of elongate segments and extending in the first direction from the second transition to a second terminal end. The bladder also comprising a web area connecting the arcuate segment, the first plurality of elongate segments, and the second plurality of elongate segments and extending to a terminal edge spaced apart from each of the first terminal end and the second terminal end.

Clause 2: The bladder of Clause 1, wherein the first plurality of elongate segments includes (i) a first heel segment extending from the first transition to a third transition, (ii) a first mid-foot segment extending from the third transition to a fifth transition, and (iii) a first forefoot segment extending from the fifth transition to the first terminal end, the arcuate segment, the first heel segment, and the first mid-foot segment being aligned along a plane and the first forefoot segment extending away from the plane.

Clause 3: The bladder of Clause 2, wherein the second plurality of elongate segments includes (i) a second heel segment extending from the first transition to a third transition, (ii) a second mid-foot segment extending from the third transition to a fifth transition, and (iii) a second forefoot segment extending from the fifth transition to the first terminal end, the arcuate segment, the second heel segment, and the second mid-foot segment being aligned along the plane and the second forefoot segment extending away from the plane.

Clause 4: The bladder of Clause 3, wherein the first heel segment and the second heel segment converge with each other along the first direction and the first mid-foot segment and the second mid-foot segment diverge from each other along the first direction.

Clause 5: The bladder of Clause 3, wherein the web area extends between the first heel segment and the second heel segment.

Clause 6: The bladder of Clause 3, wherein the first forefoot segment and the second forefoot segment are not directly connected by the web area.

Clause 7: The bladder of Clause 1, wherein a thickness of the chamber tapers continuously from the arcuate segment to each of the first terminal end and the second terminal end.

Clause 8: The bladder of Clause 1, wherein the web area includes an inflation conduit extending in a first direction from a terminal edge to one of the segments of the chamber.

Clause 9: The bladder of Clause 8, wherein the web area includes a tab extending in a second direction from the terminal edge, the tab including an inlet of the inflation conduit.

Clause 10: The bladder of Clause 9, wherein the inlet of the inflation conduit includes a crimped region formed on the tab.

Clause 11: A bladder for an article of footwear, the bladder comprising a chamber including a plurality of sequentially arranged segments fluidly coupled to each other at respective transitions. The plurality of sequentially arranged segments include (i) an arcuate segment extending along an arcuate path from a first transition on a medial side of the bladder to a second transition on a lateral side of the bladder, (ii) a first elongate segment extending in a first direction from the first transition to a third transition, (iii) a second elongate segment extending in the first direction from the second transition to a fourth transition and converging with the first elongate segment along the first direction, (iv) a third elongate segment extending in the first direction from the third transition to a first terminal end, and (v) a fourth elongate segment extending in the first direction from the fourth transition to a second terminal end, the arcuate segment and at least one of the first elongate segment and the second elongate segment cooperating to define a bottom surface plane of the chamber and the third elongate segment and the fourth elongate segment extending away from the bottom surface plane. The bladder further including a web area extending between the first elongate segment and the second elongate segment.

Clause 12: The bladder of Clause 11, wherein the web area extends continuously from the arcuate segment to a terminal edge formed between the first elongate segment and the second elongate segment.

Clause 13: The bladder of Clause 11, wherein the chamber and the web area are formed of a first barrier layer and a second barrier layer, the first barrier layer being joined to the second barrier layer in the web area and spaced apart from the second barrier layer at the chamber.

Clause 14: The bladder of Clause 13, wherein the first barrier layer comprises a first multilayer film and the second barrier layer comprises a second multilayer film.

Clause 15: The bladder of Clause 14, wherein the first multilayer film and the second multilayer film each independently comprises one or more thermoplastic polyurethane copolymers.

Clause 16: The bladder of Clause 15, wherein the first multilayer film and the second multilayer film each further independently comprises one or more ethylene-vinyl alcohol copolymers.

Clause 17: The bladder of Clause 11, wherein the arcuate segment, first elongate segment, the second elongate segment, the third elongate segment, and the fourth elongate segment cooperate to define a continuous interior void.

Clause 18: The bladder of Clause 11, wherein the third elongate segment and the fourth elongate segment curve away from the bottom surface plane.

Clause 19: The bladder of Clause 11, wherein a thickness of the chamber tapers continuously at a constant first rate from the arcuate segment to the third transition, and tapers at a variable second rate from the third transition to the first terminal end.

Clause 20: The bladder of Clause 11, wherein the chamber has a circular cross-section.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear having an upper, the sole structure comprising:
    a midsole including:
        an outer cushion extending continuously around a perimeter of the sole structure, defining a heel counter in a heel region of the sole structure, and forming a closed-loop structure defining an aperture extending continuously from the heel region of the sole structure to a forefoot region of the sole structure and configured to receive an inner cushion of the midsole; and
        a bladder including a first fluid-filled segment extending along a medial side of the sole structure from the heel region to the forefoot region and a second fluid-filled segment extending along a lateral side of the sole structure from the heel region to the forefoot region, the outer cushion of the midsole in contact with the first fluid-filled segment and the second fluid-filled segment in the heel region and the forefoot region of the sole structure.

2. The sole structure of claim 1, wherein the outer cushion of the midsole is configured to be in contact with the upper and the bladder from a first location at one of the medial side and the lateral side to a second location at the other of the medial side and the lateral side.

3. The sole structure of claim 1, wherein the bladder includes a U-shape.

4. The sole structure of claim 1, wherein the outer cushion of the midsole is in continuous contact with the first fluid-filled segment and the second fluid-filled segment from the heel region to the forefoot region.

5. The sole structure of claim 1, wherein the outer cushion of the midsole is configured to extend over an outer surface of the upper in the heel region to form the heel counter.

6. The sole structure of claim 1, wherein the inner cushion of the midsole is at least partially surrounded by the outer cushion.

7. The sole structure of claim 6, wherein the midsole further includes a lower cushion disposed closer to a ground-engaging surface of the sole structure than the outer cushion and the inner cushion.

8. The sole structure of claim 7, wherein the inner cushion and the lower cushion are in contact with one another in the forefoot region and are separated from one another by a web area of the bladder in the heel region.

9. An article of footwear incorporating the sole structure of claim 1.

10. A sole structure for an article of footwear having an upper, the sole structure comprising:
  a midsole including:
    an outer cushion defining a closed-loop structure extending around a perimeter of the sole structure, the outer cushion defining an aperture extending continuously from a heel region of the sole structure to a forefoot region of the sole structure and configured to receive an inner cushion of the midsole; and
    a bladder including a first fluid-filled segment extending along a medial side of the sole structure from the heel region to the forefoot region and a second fluid-filled segment extending along a lateral side of the sole structure from the heel region to the forefoot region, the outer cushion of the midsole in contact with the first fluid-filled segment and the second fluid-filled segment in the heel region and the forefoot region of the sole structure.

11. The sole structure of claim 10, wherein the outer cushion of the midsole tapers in height in a direction extending from the heel region to the forefoot region.

12. The sole structure of claim 10, wherein the outer cushion of the midsole is configured to be in contact with the upper and the bladder from a first location at one of the medial side and the lateral side to a second location at the other of the medial side and the lateral side.

13. The sole structure of claim 10, wherein the bladder includes a U-shape.

14. The sole structure of claim 10, wherein the outer cushion of the midsole is in continuous contact with the first fluid-filled segment and the second fluid-filled segment from the heel region to the forefoot region.

15. The sole structure of claim 10, wherein the outer cushion of the midsole is configured to extend over an outer surface of the upper in the heel region to form a heel counter.

16. The sole structure of claim 10, wherein the inner cushion of the midsole is at least partially surrounded by the outer cushion.

17. The sole structure of claim 16, wherein the midsole further includes a lower cushion disposed closer to a ground-engaging surface of the sole structure than the outer cushion and the inner cushion.

18. The sole structure of claim 17, wherein the inner cushion and the lower cushion are in contact with one another in the forefoot region and are separated from one another by a web area of the bladder in the heel region.

19. An article of footwear incorporating the sole structure of claim 10.

* * * * *